United States Patent
Patel et al.

(10) Patent No.: US 12,530,686 B2
(45) Date of Patent: Jan. 20, 2026

(54) DIRECT TRANSACTION DATA ENTRY CODING AND INTEGRATION

(71) Applicant: Ramp Business Corporation, New York, NY (US)

(72) Inventors: Veeral Dilip Patel, Bergenfield, NJ (US); Jaein Lee, New York, NY (US); Calvin Jun-Gong Lee, Weehawken, NJ (US); Geoffrey Jacques Charles, Brooklyn, NY (US); Jared Robert Wasserman, New York, NY (US); Diego D. Zaks Barrios, New York, NY (US); Ori Ephraim Goldfield, New York, NY (US); Serge Nasr, New York, NY (US); Tae Kyung Kong, Bayside, NY (US); John Sarihan, New York, NY (US)

(73) Assignee: Ramp Business Corporation, New York, NY (US)

( * ) Notice: Subject to any disclaimer, the term of this patent is extended or adjusted under 35 U.S.C. 154(b) by 200 days.

(21) Appl. No.: 17/589,837

(22) Filed: Jan. 31, 2022

(65) Prior Publication Data

US 2023/0245124 A1  Aug. 3, 2023

(51) Int. Cl.
*G06Q 20/40* (2012.01)
*G06Q 20/06* (2012.01)
*G06Q 20/08* (2012.01)
*G06Q 20/22* (2012.01)
*G06Q 20/32* (2012.01)

(52) U.S. Cl.
CPC ....... *G06Q 20/4014* (2013.01); *G06Q 20/065* (2013.01); *G06Q 20/0855* (2013.01); *G06Q 20/227* (2013.01); *G06Q 20/3255* (2013.01); *G06Q 20/4016* (2013.01)

(58) Field of Classification Search
None
See application file for complete search history.

(56) References Cited

U.S. PATENT DOCUMENTS

| | | | |
|---|---|---|---|
| 2005/0240630 A1* | 10/2005 | Cahill | G06F 16/258 |
| 2016/0286393 A1* | 9/2016 | Rasheed | H04L 63/0853 |
| 2019/0043120 A1* | 2/2019 | Ryu | G06Q 20/0855 |
| 2020/0137046 A1* | 4/2020 | Sharma | H04L 63/0861 |
| 2020/0320503 A1* | 10/2020 | Mell | G06Q 20/204 |
| 2021/0027394 A1* | 1/2021 | Yee | G06Q 40/02 |

* cited by examiner

*Primary Examiner* — Neha Patel
*Assistant Examiner* — Nicholas K Phan
(74) *Attorney, Agent, or Firm* — Fenwick & West LLP

(57) ABSTRACT

A system for annotating transactions includes a computing server configured to retrieve annotation requirements for transaction accounts of an organization client, where the annotation requirements specify a data field of a third-party platform's schema that is used to organize transaction data. The organization client may further specify which transactions need to be annotated using selection criteria. The computing server processes transactions incurred using the transaction accounts and identifies unannotated transactions using the selection criteria. End users who are responsible for annotating the unannotated transactions are provided direct links to annotate the unannotated transactions. Upon receiving annotations from the responsible end users, the computing server can display annotated transaction data for an administrator of the organization client.

20 Claims, 11 Drawing Sheets

600

GENERAL EXPENSES

Specify fields to be collected from cardholders

Policy Name
General Expenses

 This policy controls 908 active cards.

Any changes to this policy will apply for transactions on those cards going forward. Past transactions are unaffected.

Fields:

610 — Receipt | Required ⌄ | for | Transactions Above ⌄ | $75.00

620 — Memo | Required ⌄ | for | Transactions Above ⌄ | $75.00

630 — FastFiles Category | Required ⌄ | for | All Transactions ⌄
— 631              — 632

640 — FastFiles Class | Not Required ⌄

650 — FastFiles Customer/Job | Not Required ⌄

Edit   Cancel

*FIG. 6*

| | Card | Cardholder | Current Balance | Limit | Card Program | Location |
|---|---|---|---|---|---|---|
| ☐ | Soona photoshoot | Aaron R. | $138.00 | $138.00 | None | NY |
| ☐ | Finance + BizOps | Alex S. | $1240.49 | $1240.49 | None | Main |
| ☐ | Wellness Benefit | Allison C. | $75.00 | $75.00 | Wellness Benefit | Main |
| ☐ | Monthly Short Sli.. | Ariel L. | $25.00 | $25.00 | None | CA |
| ☐ | Software Subscri.. | David Y. | $30.00 | $30.00 | None | Main |
| ☐ | Wellness Benefit | Glenn R. | $75.00 | $75.00 | Wellness Benefit | Main |
| ☐ | Education | Jonathan A. | $600.00 | $1000.00 | None | PA |
| ☐ | Breakroom supplies | Wei Z. | $168.00 | $500.00 | None | NY |

*FIG. 7*

DIRECT TRANSACTION DATA ENTRY CODING AND INTEGRATION

TECHNICAL FIELD

The present disclosure generally relates to managing transactions in network communications and, particularly, annotating transactions according to schemas of third-party platforms.

BACKGROUND

Monitoring transactions is valuable for fraud prevention, resource allocation, budgeting, diagnostics, and more. To monitor transactions, data about the transactions are gathered and maintained using various software platforms that may be designed by different third parties. Various third-party software platforms have their own data schemas for organizing the transaction data. Those software platforms often use different schemas such as different metadata tags and data fields to annotate transactions. As an example, hundreds of thousands of annotations can be generated when monitoring and organizing tens of thousands of transactions that can happen in a day. A server charged with determining annotations can thus expend immense processing and storage resources determining and storing many annotations for the various software platforms' schemas. The server may be tasked with analyzing a transaction to determine annotations that likely characterize the transaction, inferring various metadata tags from scant information such as a date, amount, and entities involved in the transaction. The annotation can thus be inaccurate in addition to processing intensive. The server may also be tasked with storing the metadata tags used for annotation, but due to the lack of standardized schema for annotating transactions, may create different data structures for each schema despite similar or the same metadata tags being stored. Accordingly, conventional systems for annotating transactions consume many processing and storage resources.

SUMMARY

Embodiments are related to transaction verification processes and architectures that reduce the processing and network bandwidth resource consumption by a computing server handling the transaction verification. In one embodiment, a computing server creates transaction accounts for an organization client. A transaction account may allow an owner of the account to perform transaction with third-party named entities. The organization client can manage how the transactions are annotated by providing the computing server with annotation requirements and selection criteria. The annotation requirements can specify a data field of a third-party platform's schema with which transactions are to be annotated. The schema may be used by the third-party platform to organize transaction data (e.g., annotating with metadata tags such as entity categories and locations). The selection criteria may specify which transactions need to be annotated (e.g., transactions over a certain amount or incurred during a certain time window). The computing server can process transactions on behalf of the organization client and identify unannotated transactions using the selection criteria. The computing server may request certain end users annotate the unannotated transactions by identifying the responsible end user associated with the unannotated transactions (e.g., end users who incurred the transactions) and transmitting a direct link to those responsible end users. The direct link can bring responsible end users directly to respective annotation pages specific to the unannotated transactions. The annotation pages allow the responsible end users to annotate the unannotated transactions. The computing server receives annotations of the unannotated transactions, including data field values of the third-party platforms' schemas. The computing server can then display, at a graphical user interface (GUI) for an administrator of the organization client, entries of annotated transaction data that include the data field values. The graphical user interface may allow the administrator to export the annotated transaction data to the third-party platform.

BRIEF DESCRIPTION OF THE DRAWINGS

FIG. 6 illustrates a transaction data collection management portal, in accordance with an embodiment.

FIG. 7 illustrates a card management portal, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
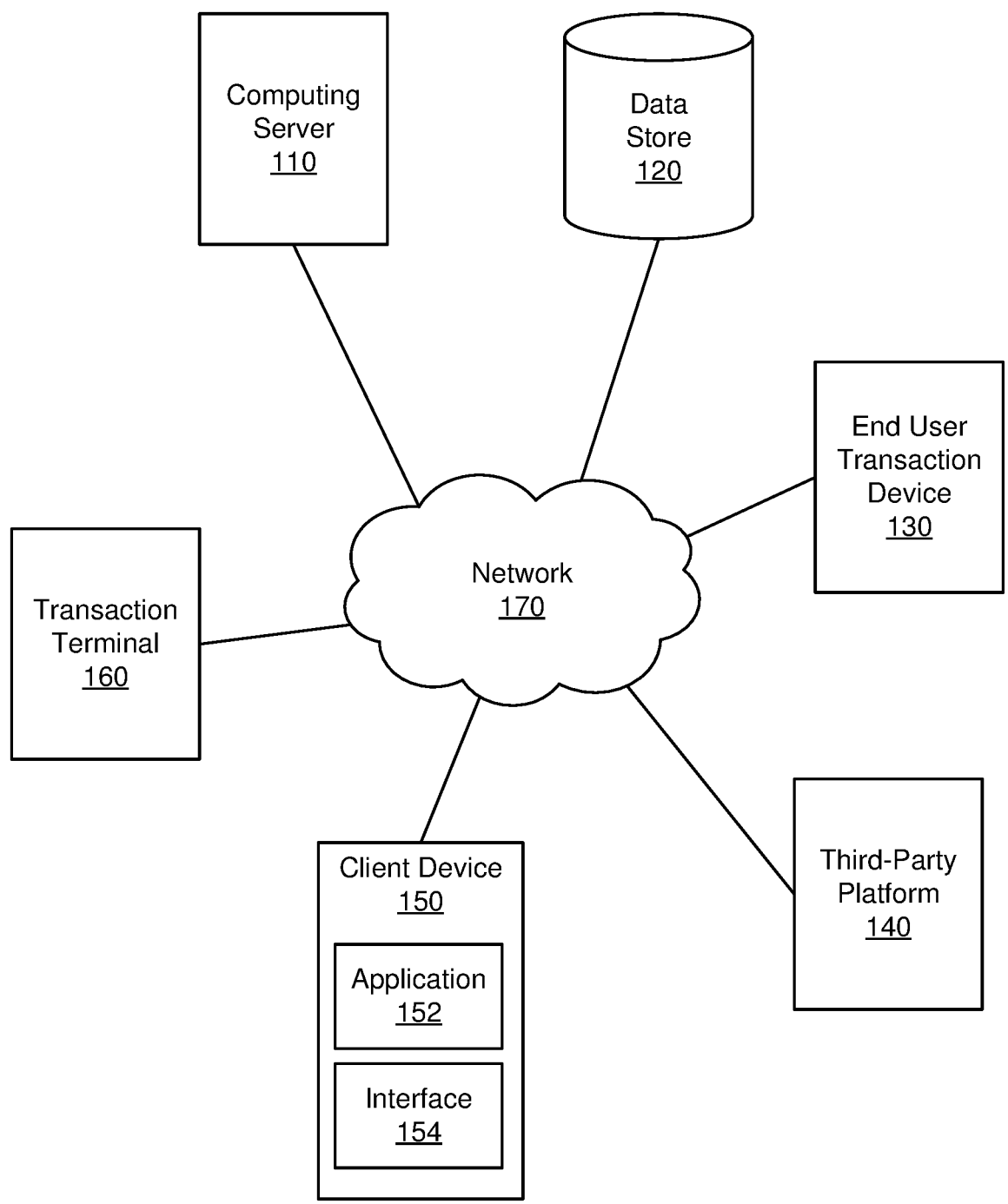
FIG. 1 is a block diagram illustrating an example system environment, in accordance with an embodiment.

FIG. 1 is a block diagram that illustrates a transaction management system environment 100, in accordance with an embodiment. The system environment 100 includes a computing server 110, a data store 120, an end user transaction device 130, a third-party platform 140, a client device 150, and a transaction terminal 160. The entities and components in the system environment 100 communicate with each other through a network 170. In various embodiments, the system environment 100 includes fewer or additional components. In some embodiments, the system environment 100 also includes different components. While each of the components in the system environment 100 is described in a singular form, the system environment 100 may include one or more of each of the components. For example, in many situations, the computing server 110 can issue multiple end user transaction devices 130 for different end users. Different client devices 150 may also access the computing server 110 simultaneously.

The computing server 110 includes one or more computers that perform various tasks related to managing accounting, payments, and transactions of various clients of the computing server 110. For example, the computing server 110 creates credit cards and accounts for an organization client, manages transactions of the cards of the organization client based on rules set by the client (e.g., pre-authorization and restrictions on certain transactions), and facilitates the annotation by the end users involved in incurring the transactions (e.g., tagging the transactions with metadata tags specified third-party bookkeeping platform schemas). Examples of organizations may include commercial businesses, educational institutions, private or government agencies, or any suitable group of one or more individuals that engage in transactions with a named entity (e.g., a merchant) using an account associated with a credit card. In some embodiments, a named entity may be an identifiable real-world entity that may be detectable in data of an organization. For example, a specific merchant may be a named entity and a merchant may refer to an organization that provides goods or services for purchase using the end user transaction device 130.

Client organizations may use third-party platforms (e.g., third-party platform 140) as bookkeeping tools to manage the transaction data resulting from the transaction accounts created for their personnel. The third-party platforms organize transaction data using their own data structures according to a schema. Each schema may include different data fields, which may include metadata tags and annotation data fields. The annotation and organization of transaction data into third-party schemas enables transaction data to be easily queried, sorted, and filtered due to the standardized structure provided by the schemas.

An end user may be a member of an organization client such as an employee of the organization or an individual that uses the end user transaction device 130 to make purchase from a named entity. In one embodiment, the computing server 110 provides its clients with various payment and spending management services as a form of cloud-based software, such as software as a service (SaaS). Examples of components and functionalities of the computing server 110 are discussed in further detail below with reference to FIG. 2. The computing server 110 may provide a SaaS platform for various clients to manage their accounts and transaction rules related to the accounts.

The data store 120 includes one or more computing devices that include memory or other storage media for storing various files and data of the computing server 110. The data stored in the data store 120 includes accounting information, transaction data, credit card profiles, card rules and restrictions, merchant profiles, merchant identification rules, annotation rules for metadata tags with which transactions are to be annotated, or selection criteria for determining which transactions are to be annotated and other related data associated with various clients of the computing server 110. In various embodiments, the data store 120 may take different forms. In one embodiment, the data store 120 is part of the computing server 110. For example, the data store 120 is part of the local storage (e.g., hard drive, memory card, data server room) of the computing server 110. In some embodiments, the data store 120 is a network-based storage server (e.g., a cloud server). The data store 120 may be a third-party storage system such as AMAZON AWS, DROPBOX, RACKSPACE CLOUD FILES, AZURE BLOB STORAGE, GOOGLE CLOUD STORAGE, etc. The data in the data store 120 may be structured in different database formats such as a relational database using the structured query language (SQL) or other data structures such as a non-relational format, a key-value store, a graph structure, a linked list, an object storage, a resource description framework (RDF), etc. In one embodiment, the data store 120 uses various data structures mentioned above.

An end user transaction device 130 is a device that enables the holder of the device 130 to perform a transaction with a party (e.g., a named entity), such as making a payment to a merchant for goods and services based on information and credentials stored at the end user transaction device 130. An end user transaction device 130 may also be referred to as an end user payment device. Examples of end user transaction devices 130 include payment cards such as credit cards, debit cards, and prepaid cards, other smart cards with chips such as radio frequency identification (RFID) chips, portable electronic devices such as smart phones that enable payment methods such as APPLE PAY or GOOGLE PAY, and wearable electronic devices. The computing server 110 issues end user transaction devices 130 such as credit cards for its organization clients and may impose spending control rules and restrictions on those cards. While credit cards are often used as examples in the discussion of this disclosure, various architectures and processes described herein may also be applied to other types of end user transaction devices 130. In some cases, an end user transaction device 130 may also be a virtual device such as a virtual credit card.

A third-party platform 140 is a server that receives transaction data from multiple sources (e.g., various client organizations) and keeps data records of the transactions performed by the sources. A third-party platform may be referred to as a bookkeeping platform. Examples of bookkeeping platforms include NETSUITE, SAGE, and QUICKBOOKS. The third-party platform 140 may be operated by an entity different from the entity operating the computing server 110. Although one third-party platform is shown in FIG. 1, the computing server 110 may communicate with multiple third-party platforms. Each third-party platform may manage and maintain data records of transactions using respective schemas (e.g., data structure and fields can be unique to each third-party platform). For example, one third-party platform may store information describing a merchant category under the data field "class" while another third-party platform may store the information under the data field "group." In another example, different third-party platforms may have a different number of data fields for recording transaction data. Additional examples of third-party platforms are described in U.S. patent application Ser. No. 17/498,664, entitled "Domain-Specific Data Records Synchronization," filed Oct. 11, 2021, and is incorporated by reference herein for all purposes.

A client device 150 is a computing device that belongs to a client of the computing server 110. A client uses the client device 150 to communicate with the computing server 110 and performs various payment and spending management related tasks such as creating credit cards and associated payment accounts, setting rules and restrictions on cards, setting pre-authorized or prohibited merchants or merchant categories (e.g., entertainment, travel, education, health, etc.), and managing transactions (e.g., requesting annotations for certain transactions using third-party platform schema data fields). The user of the client device 150 may be a manager, an accounting administrator, or a general employee of an organization. While in this disclosure a client is often described as an organization, a client may also be a natural person or a robotic agent. A client may be referred to an organization or its representative such as its employee. A client device 150 includes one or more applications 142 and interfaces 144 that may display visual elements of the applications 142. The client device 150 may be any computing device. Examples of such client devices 130 include personal computers (PC), desktop computers, laptop computers, tablets (e.g., iPads), smartphones, wearable electronic devices such as smartwatches, or any other suitable electronic devices.

The application 142 is a software application that operates at the client device 150. In one embodiment, an application 142 is published by the party that operates the computing server 110 to allow clients to communicate with the computing server 110. For example, the application 142 may be part of a SaaS platform of the computing server 110 that allows a client to create credit cards and accounts and perform various payment and spending management tasks (e.g., annotate transactions according to schemas of third-party platforms). In various embodiments, an application 142 may be of different types. In one embodiment, an application 142 is a web application that runs on JavaScript and other backend algorithms. In the case of a web application, the application 142 cooperates with a web browser to render a front-end interface 144. In another embodiment, an application 142 is a mobile application. For example, the mobile application may run on Swift for iOS and other APPLE operating systems or on Java or another suitable language for ANDROID systems. In yet another embodiment, an application 142 may be a software program that operates on a desktop computer that runs on an operating system such as LINUX, MICROSOFT WINDOWS, MAC OS, or CHROME OS.

An interface 144 is a suitable interface for a client to interact with the computing server 110. The client may communicate to the application 142 and the computing server 110 through the interface 144. The interface 144 may take different forms. In one embodiment, the interface 144 may be a web browser such as CHROME, FIREFOX, SAFARI, INTERNET EXPLORER, EDGE, etc. and the application 142 may be a web application that is run by the web browser. In one embodiment, the interface 144 is part of the application 142. For example, the interface 144 may be the front-end component of a mobile application or a desktop application. In one embodiment, the interface 144 also is a graphical user interface (GUI) which includes graphical elements and user-friendly control elements. In one embodiment, the interface 144 does not include graphical elements but communicates with the data management server 120 via other suitable ways such as application program interfaces (APIs), which may include conventional APIs and other related mechanisms such as webhooks.

In some embodiments, the client device 150 and the end user transaction device 130 belong to the same domain. For example, a company client can request the computing server 110 to issue multiple company credit cards for the employees. A domain refers to an environment in which a system operates and/or an environment for a group of units and individuals to use common domain knowledge to organize activities, information and entities related to the domain in a specific way. An example of a domain is an organization, such as a business, an institute, or a subpart thereof and the data within it. A domain can be associated with a specific domain knowledge ontology, which could include representations, naming, definitions of categories, properties, logics, and relationships among various concepts, data, transactions, and entities that are related to the domain. The boundary of a domain may not completely overlap with the boundary of an organization. For example, a domain may be a subsidiary of a company. Various divisions or departments of the organization may have their own definitions, internal procedures, tasks, and entities. In other situations, multiple organizations may share the same domain.

A transaction terminal 160 is an interface that allows an end user transaction device 130 to make electronic fund transfers with a third party such as a third-party named entity. Electronic fund transfer can be credit card payments, automated teller machine (ATM) transfers, direct deposits, debits, online transfers, peer-to-peer transactions such as VENMO, instant-messaging fund transfers such as FACEBOOK PAY and WECHAT PAY, wire transfer, electronic bill payment, automated clearing house (ACH) transfer, cryptocurrency transfer, blockchain transfer, etc. Depending on the type of electronic fund transfers, a transaction terminal 160 may take different forms. For example, if an electronic fund transfer is a credit card payment, the transaction terminal 160 can be a physical device such as a point of sale (POS) terminal (e.g., a card terminal) or can be a website for online orders. An ATM, a bank website, a peer-to-peer mobile application, and an instant messaging application can also be examples of a transaction terminal 160. The third party is a transferor or transferee of the fund transfer. For example, in a card transaction, the third party may be a named entity (e.g., a merchant). In an electronic fund transfer such as a card payment for a merchant, the transaction terminal 160 may generate a transaction data payload that carries information related to the end user transaction device 130, the merchant, and the transaction. The transaction data payload is transmitted to other parties, such as credit card companies or banks, for approval or denial of the transaction.

Various servers in this disclosure may take different forms. In one embodiment, a server is a computer that executes code instructions to perform various processes described in this disclosure. In another embodiment, a server is a pool of computing devices that may be located at the same geographical location (e.g., a server room) or be distributed geographically (e.g., clouding computing, distributed computing, or in a virtual server network). In one embodiment, a server includes one or more virtualization instances such as a container, a virtual machine, a virtual private server, a virtual kernel, or another suitable virtualization instance.

The network 170 provides connections to the components of the system environment 100 through one or more sub-networks, which may include any combination of local area and/or wide area networks, using both wired and/or wireless communication systems. In one embodiment, a network 170 uses standard communications technologies and/or protocols. For example, a network 170 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 170 may be represented using any suitable format, such as hypertext markup language (HTML), extensible markup language (XML), JavaScript object notation (JSON), structured query language (SQL). In some embodiments, some of the communication links of a network 170 may be encrypted using any suitable technique or techniques such as secure sockets layer (SSL), transport layer security (TLS), virtual private networks (VPNs), Internet Protocol security (IPsec), etc. The network 170 also includes links and packet switching networks such as the Internet. In some embodiments, a data store belongs to part of the internal computing system of a server (e.g., the data store 120 may be part of the computing server 110). In such cases, the network 170 may be a local network that enables the server to communicate with the rest of the components.

Example Server Components

Figure 2:
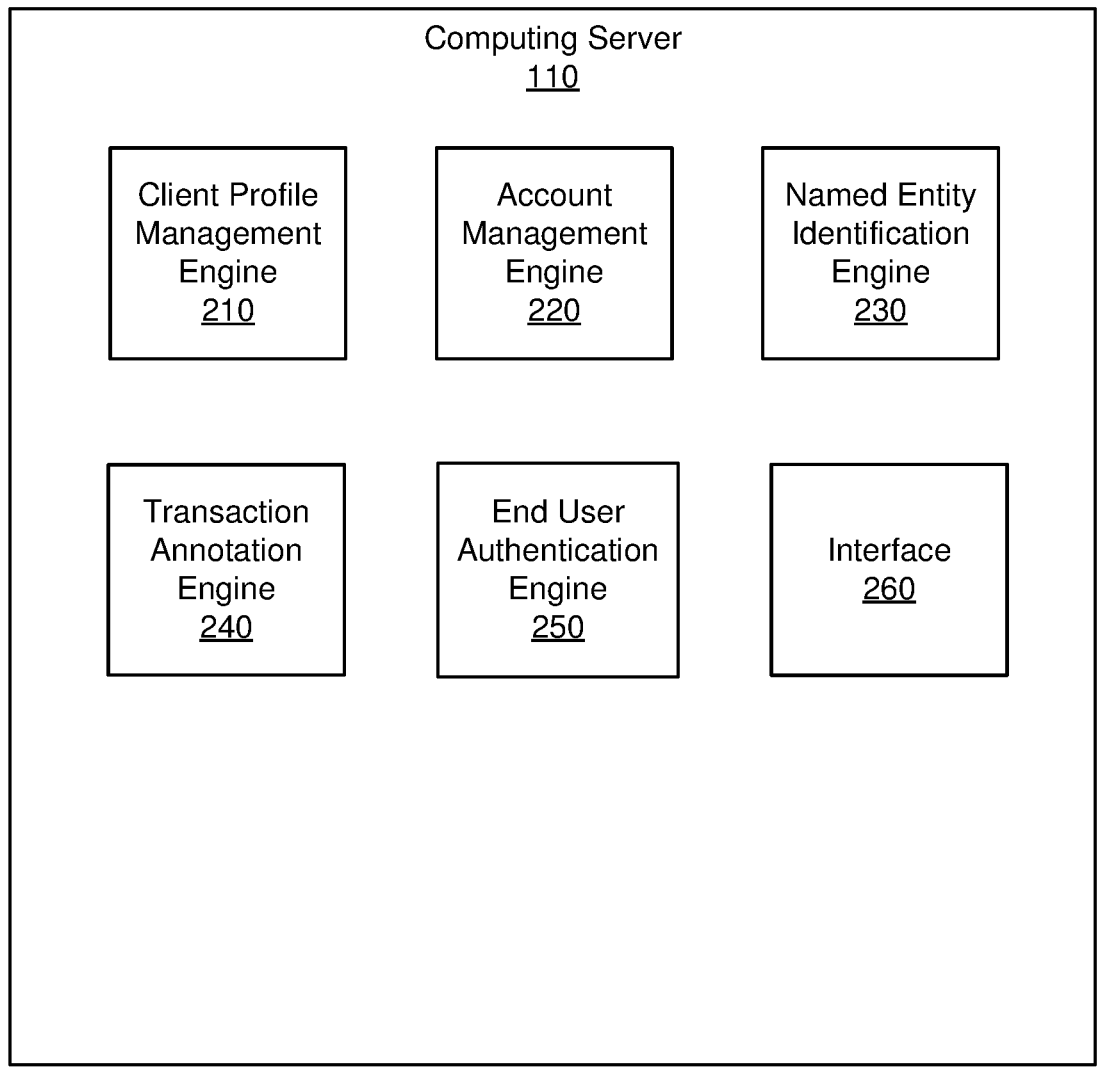
FIG. 2 is a block diagram illustrating components of an example computing server, in accordance with an embodiment.

FIG. 2 is a block diagram illustrating components of a computing server 110, in accordance with an embodiment. The computing server 110 includes a client profile management engine 210, an account management engine 220, a named entity identification engine 230, a transaction annotation engine 240, an end user authentication engine 250, and an interface 260. In various embodiments, the computing server 110 may include fewer or additional components. For example, in some embodiments, the computing server 110 may also include a transaction approval server (e.g., the server 340 that will be discussed in further detail in FIG. 3). The functions of various components may be distributed in a different manner than described below. Moreover, while each of the components in FIG. 2 may be described in a singular form, the components may present in plurality. The components may take the form of a combination of software and hardware, such as software (e.g., program code comprised of instructions) that is stored on memory and executable by a processing system (e.g., one or more processors).

The client profile management engine 210 stores and manages end user data and transaction data of clients of the computing server 110. The computing server 110 can serve various clients associated with end users such as employees, vendors, and customers. For example, the client profile management engine 210 may store the employee hierarchy of a client to determine the administrative privilege of an employee in creating a credit card account and in setting transaction rules, selection criteria for annotating transactions, and annotation requirements. An administrator of the client may specify that certain employees from the financial department and managers have the administrative privilege to create cards for other employees.

The client profile management engine 210 may organize or categorize transaction data of an organization client according to metadata tags (e.g., the annotation requirements specified by the organization client). The metadata tags can include tags specified by a third-party platform, create tags (e.g., tags for transaction types, merchants, date, amount, card, employee groups, etc.), or a combination thereof. The client profile management engine 210 may process transactions on behalf of an organization client by generating and organizing the transaction data of the transactions into a data structure. Each entry of the data structure may correspond to a transaction. The fields of the data entries can include the metadata tags. The client profile management engine 210 can annotate a data entry by storing values in the fields of the data entries. For example, the client profile management engine 210 annotates a data entry with values of data fields of a third-party platform's schema by storing the values in fields of the data entry assigned to the schema's data fields. The client profile management engine 210 may use a common or standardized data structure format for organizing the transaction data of a client. This standardized format may enable different third-party platforms' schema to be standardized within a single data structure. For example, a single client may use two different bookkeeping platforms. Each of the bookkeeping platforms can use the same data field name or different data field names across their different schemas (e.g., one platform uses "category" and another uses "group"). The client profile management engine 210 may maintain a mapping of different data field names that refer to the same characteristic of transaction data, and use the mapping when creating or updating a data entry with transaction data or user-provided annotations. In this way, the computer server 110 can receive annotation for various schemas and organize the annotation into a common format for organizing transaction data agnostic of the third-party platform used for annotating the transaction data.

The client profile management engine 210 can monitor the spending of a client by category and also by the total spending. The spending amounts may affect the results of transaction rules and selection criteria for annotating transactions that are specified by an organization client's administrator. For example, a client may limit the total monthly spending of an employee group. The computing server 110 may deny further card payments after the total spending exceeds the monthly budget.

The account management engine 220 creates and manages accounts including payment accounts such as credit cards that are issued by the computing server 110. An account is associated with an end user such as an employee and corresponds to a card or an end user transaction device. A client may use the computing server 110 to issue domain-specific payment accounts such as company cards. The client enters account information such as the cardholder's name, role and job title of the cardholder in the client's organization, limits of the card, and transaction rules associated with the card. The client may use the client device 150 and the interface 154 to supply this information to the computing server 110. In response to receiving the account information (e.g., from the client device 150), the account management engine 220 creates the card serial number, credentials, a unique card identifier, and other information needed for the generation of a payment account and corresponding card. The account management engine 220 associates the information with the cardholder's identifier. The computing server 110 communicates with a credit card company (e.g., VISA, MASTERCARD) to associate the card account created with the identifier of the computing server 110 so that transactions related to the card will be stored at client profile management engine 210 with a mapping to identifiers for the account and the client's organization for querying transactions of the client organization. The account management engine 220 may also order the production of the physical card that is issued under the computing server 110. The cards and payment accounts created are associated with the transaction rules, selection criteria for annotating transactions, and/or annotation requirements that are specified by the client's administrator.

In some embodiments, the account management engine 220 creates and stores selection criteria that specifies annotations are required for transaction data that meets the selection criteria. A client may provide to the computing server 110 criteria under which transactions are to be annotated by the computing server 110. The client may use the interface 154 of the client device 150 to specify the criteria. Examples of selection criteria can include a transaction amount, a transaction location, a transaction date, a third-party named entity category, a third-party named entity name, any suitable parameter related to a transaction, or a combination thereof. In one example of a rule, the client specifies that an annotation is required for transaction amounts above seventy five dollars. In another example of a rule, the client specifies that annotations are not required for transactions incurred with a particular merchant. In some embodiments, the account management engine 220 may recommend selection criteria to a client based on a history of selection criteria used by clients that share similar characteristics (e.g., industry type, number of employees, card transaction rules, etc.). The client may specify priority for criteria such that a certain criterion may override another criterion. For example, the account management engine 220 may determine that, under the previous two examples of criterions, the client has specified that rules for requiring annotations overrides rules for not requiring annotation, and cause the transaction annotation engine 240 to request an annotation for, for example, a transaction made with the particular merchant that was over seventy five dollars.

Upon determining whether annotation is needed using the selection criteria created by the account management engine 220, the transaction analysis engine 240 may annotate or flag a record of the transaction with an indicator that the transaction is unannotated and whether it needs to be annotated. This indicator may be used when generating a user interface for the client when managing annotation statuses of past transactions. The selection criteria may be different for each cardholder, each cardholder program (e.g., multiple card holders sharing one or more characteristics specified by a client can be grouped into a program), or each client. In this way, for example, a client can customize which transactions are to be annotated rather than apply a single rule for employees in different groups that may use the cards in different ways. A client may establish such rules through an interface generated by the interface 250 (e.g., example interface of FIG. 6).

The account management engine 220 creates and stores annotation requirements regarding which data fields (e.g., metadata tags) are required for annotating the transaction data that meets the selection criteria. The data fields can include data fields of a third-party platform. Different third-party platforms may have different schema (e.g., different permutations of data fields) for organizing transaction data. The account management engine 220 may receive data fields from third-party platforms and receive annotation requirements from clients specifying which third-party platform and schema to use for the transaction accounts of the client. A single client may use one or more third-party platforms, and the account management engine 220 may maintain a record of which third-party platforms are used for which of the transaction accounts of the client. The account management engine 220 can receive one or more selection criteria from an organization client (e.g., via the interface 154).

The named entity identification engine 230 identifies specific named entities (e.g., merchants) associated with various transactions. The computing server 110 may impose an entity-specific restriction on a card. For example, an administrator of a client may specify that a specific card can only be used with a specific named entity. The computing server 110 parses transaction data from different clients to identify patterns in the transaction data specific to certain named entities to determine whether a transaction belongs to a particular named entity. For example, in a card purchase, the transaction data includes merchant identifiers (MID), merchant category code (MCC), and the merchant name. However, those items are often insufficient to identify the actual merchant of a transaction. The MID is often an identifier that does not uniquely correspond to a merchant. In some cases, the MID is used by the POS payment terminal company such that multiple real-world merchants share the same MID. In other cases, a merchant (e.g., a retail chain) is associated with many MIDs with each branch or even each registry inside a branch having its own MID. The merchant name also suffers the same defeats as the MID. The merchant name may also include different abbreviations of the actual merchant name and sometimes misspelling. The string of the merchant name may include random numbers and random strings that are not related to the actual real-world name of the merchant. The named entity identification engine 230 applies various algorithms and machine learning models to determine the actual merchant from the transaction data. For example, the named entity identification engine 230 may search for patterns in transaction data associated with a particular merchant to determine whether a transaction belongs to the merchant. For example, a merchant may routinely insert a code in the merchant name or a store number in the merchant name. The named entity identification engine 230 identifies those patterns to parse the actual merchant name.

A named entity identification process may be used to determine the identities of named entities included in processed real-time transaction. In one embodiment, the computing server 110 determines a named entity identification rule by analyzing patterns in the volume of data associated with the plurality of clients. For example, the volume of data may include past transaction data payloads of different clients. The computing server 110 may analyze the past transaction data payloads to determine a common pattern associated with payloads of a particular named entity. The named entity identification rule may specify, for example, the location of a string, the prefix or suffix to removed, and other characteristics of the data payload. The computing server 110, upon the receipt of a transaction data payload, identifies a noisy data field in the transaction data (e.g., a noisy string of text). A noisy data field is a field that includes information more than the named entity. For example, a noisy data field may include a representation of a named entity, such as the name, an abbreviation, a nickname, a subsidiary name, or an affiliation of the named entity. The noisy data field may further include one or more irrelevant strings that may be legible but irrelevant or may even appear to be gibberish. The computing server 110 parses the representation of the named entity based on the named entity identification rule. A transaction approval process can be based on the identity of the named entity. This general framework may be used by one or more computing servers to identify named entities in transaction data payloads.

The transaction annotation engine 240 annotates transactions incurred between third party named entities and transaction accounts of clients. The transaction annotation engine 240 may identify transactions that need to be annotated based on selection criteria stored in the account management engine 220. The transaction annotation engine 240 can identify an end user that is responsible for annotating the identified unannotated transaction. The transaction annotation engine 240 may send requests to responsible end users to annotate the transactions. After receiving an annotation from a responsible end user, the transaction annotation engine 240 may create annotated transaction data entries. In one example of creating an annotated transaction data entry, the transaction annotation engine 240 may store values provided by the user for annotation into a data entry for the corresponding unannotated transaction. The data entry may include fields for annotation (e.g., data fields of a third-party platform's schema for annotating transactions). By identifying unannotated transactions that need to be annotated, identifying end users to annotate the transactions, and requesting the end users to annotate the transactions, the transaction annotation engine 240 enables the computing server 110 to maintain a database of transaction data that is up to date with metadata tags for organizing transactions for clients. In particular, different clients may use different sets of metadata tags for annotation. For example, different clients may use different bookkeeping platforms to organize transactions made by employees. The transaction annotation engine 240, by using the annotation requirements that specify which annotation tags the different clients, cardholders, or programs of cardholders can use, enables the computing server 110 to conserve processing resources at the computing server 110 by distributing the annotation task to end users. For example, rather than the computing server 110 determining annotation information in varying schemas for tens of thousands of transactions by end users daily, the computing server 110 generates user interfaces that guides the end users to properly annotate transaction information according to an appropriate schema for their client organization or transaction account. In this way, the computing server 110 can reduce processing resources generating a user interfaces at a much smaller scale (e.g., ten of the same interfaces) than processing tens of thousands of different transactions daily.

The transaction annotation engine 340 can access one or more selection criteria stored in the account management engine 220. A selection criterion may specify transactions that need to be annotated. The transaction annotation engine 340 may traverse transactions (e.g., traversing entries in a data structure of transaction data) and determine one or more of the transactions that need to be annotated according to the selection criteria. For example, the selection criteria specifies that transactions for a particular group of cardholders (e.g., a cardholder program) need to be annotated if they are made with merchants that provide subscription services (e.g., reoccurring transactions made using the same transaction account). The computing server 110 may identify reoccurring transactions, example methods for which are discussed in further detail in the U.S. patent application Ser. No. 17/390,701, entitled "User Interface for Recurring Transaction Management," filed Jul. 30, 2021, and is incorporated by reference herein for all purposes. The transaction engine 340 may then flag the transactions that meet the selection criteria as unannotated transactions that need annotations.

The transaction annotation engine 340 can request end users of the transaction accounts used to incur the unannotated transactions to annotate the unannotated transactions. To request that end users annotate the unannotated transactions, the transaction annotation engine 340 can identify end users responsible for annotating the transactions and transmit a direct link to those responsible end users. To identify a responsible end user, the transaction annotation engine 340 can query for a user identifier to contact the responsible user using the transaction account (e.g., an account number associated with the transaction account). In one example, the client profile management engine 210 can be queried by the transaction annotation engine 340 using an account number to determine a profile that maps a user identifier (e.g., email address, phone number, or SaaS platform user name) to the account number. The transaction annotation engine 340 can generate a direct link that can bring the responsible end user to an annotation page to annotate one or more transactions.

The transaction annotation engine 340 can transmit a direct link to responsible end users through one or more communication channels. Examples of communication channels include an email service, short message service (SMS), or a website hosted by the computing server 110. An example of using email to provide a direct link to an end user is shown in FIGS. 5A-G. The transaction annotation engine 340 may transmit a request to a third party application service (e.g., FIREBASE) to generate a direct link and receive the direct link from the third party application service. In some embodiments, the direct link may cause a web browser to directly land to a webpage that is used for the annotation without further selection by the responsible end user on the transactions. In some embodiments, the direct link may land the user to an annotation webpage without further verification or authentication. For example, the user may not need to provide login credentials before accessing the annotation webpage through the direct link. The annotation webpage may be specific to the particular responsible end user and may automatically match the particular transaction that needs to be annotated. The webpage includes user input fields for the responsible user to provide annotation data field values. This webpage may be referred to as an annotation webpage. The annotation webpage can be specific to a particular transaction so that the user input fields for annotation may be used by the transaction annotation engine 340 to fill a data entry that corresponds to a specific transaction. The user input fields of the annotation webpage may be generated according to annotation requirements for the responsible end user or the transaction.

Figure 4:
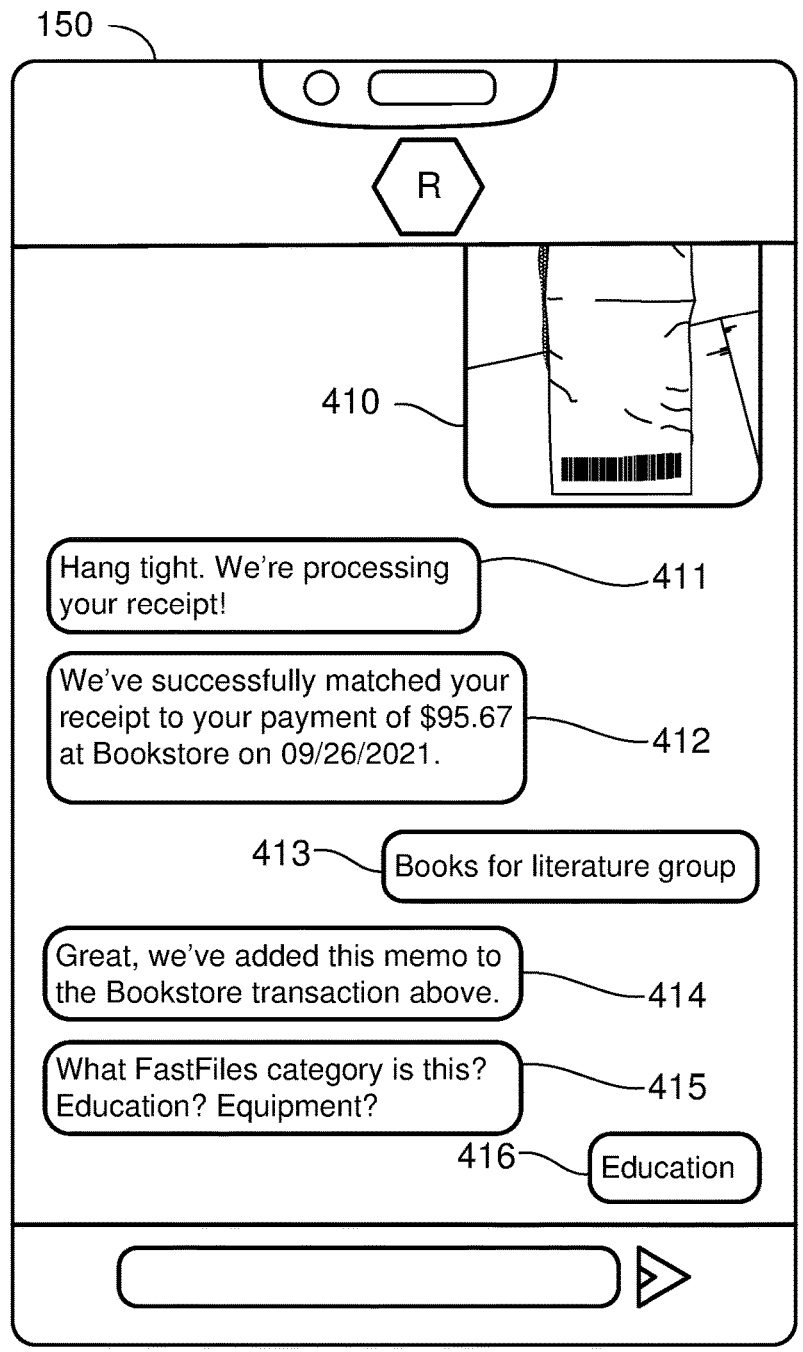
FIG. 4 depicts example transaction annotation interactions using a device of an end user, in accordance with an embodiment.

In some embodiments, the transaction annotation engine 340 may request that a responsible end user annotate a transaction without a direct link. An example of using SMS to request a user annotate a transaction is shown in FIG. 4. The transaction annotation engine 340 directly prompts the user to supply annotation data field values using questions. A question may be associated with a particular data field that is required to be annotated according to a client's annotation requirements. Before or while providing the request for an end user to annotate an unannotated transaction, the transaction annotation engine 340 may instruct the end user authentication engine to verify an identify of the end user. The transaction annotation engine 340 may verify the identity before receiving an annotation from the user and creating an annotated data entry.

The transaction annotation engine 340 may receive, from the end users, annotations of the unannotated transactions. In some embodiments, one or more annotations include data field values of a third-party platform's schema. An end user may provide annotations using a device and a communication channel (e.g., email, SMS, or SaaS platform website). The computing server 110 may provide a user interface for the end user to provide the annotations. Example interfaces for providing annotations are shown in FIGS. 4 and 5. In some embodiments, the transaction annotation engine 340 may receive different annotations for end users of different organization clients. Those organization clients may use different third-party platforms. Accordingly, the received annotations may have different data field values corresponding to schemas used by the different third-party platforms.

The end user authentication engine 250 may verify an identity of an end user that is annotating a transaction. The end user authentication engine 250 may execute a multi-factor authentication (MFA) process with an end user. In response to the end user successfully completing the MFA process, the end user authentication engine 250 may generate a token that includes authentication information and store the token on a device of the end user. The end user authentication engine 250 may encrypt the token and store the encrypted token on the device. In one example of creating and storing an encrypted token, the end user authentication engine 250 creates an encrypted Hypertext Transfer Protocol (HTTP) cookie using Advanced Encryption Standard (AES) 256 and stores the encrypted HTTP cookie at a web browser application of the end user's device. Other token and encryption methods may be used to create and store tokens carrying authentication information (e.g., JSON Web Token (JWT)). The authentication information stored in a token may include a date/time on which the token is created, an identifier of the end user's device (e.g., device class such as tablet or smartphone), or an identifier of the end user (e.g., the end user's name). Each token may have an expiration date that can be calculated using the date/time on which the token is created. By storing an encrypted token at the user's device, the computing server 110 may use the encrypted token to authenticate the user without requiring the user to provide login credentials to annotate transactions.

In one example of authenticating an end user, the end user authentication engine 250 accesses the encrypted token stored in the end user's device in response to the end user selecting a direct link. The end user authentication engine 250 then decrypts the encrypted token to obtain authentication information of the end user and determines that the token has not expired based on a creation date included in the authentication information. In response to determining the token has not expired, the end user authentication engine 250 verifies the identity of the end user using the direct link and the authentication information. In some embodiments, if the identity of the user cannot be verified using the encrypted token, the end user authentication engine 250 may prompt the user to provide login credentials (e.g., perform an MFA process).

The interface 260 includes interfaces that are used to communicate with different parties and servers. The interface 260 may take the form of a SaaS platform that provides clients with access of various functionalities provided by the computing server 110. The interface 260 provides a portal in the form of a graphical user interface (GUI) for clients to create payment accounts, manage transactions, specify rules of each card, and annotate transactions incurred using the cards. Examples of the GUI elements of the interface 260 are shown in FIG. 5 through FIG. 8. The interface 260 is in communication with the application 152 and provides data to render the application 152. The interface 260 may be in communication with a third-party platform (e.g., the third-party platform 140) to export transaction data to the third-party platform. For example, the computing server 110 may use the interface 260 to provide transaction data to the third-party platform 140 in batches by providing the data structure of transactions for a client in a file format suitable for the data structure (e.g., a spreadsheet file). The interface 260 may provide a portal for display that shows annotated transaction data that includes annotation provided by end users (e.g., data field values of third-party platforms' schemas). The portal may include a GUI element that allows a user to export the annotated transaction data to a third-party platform. The interface 260 may generate a portal of annotated transaction data that can be sorted according to schemas used to annotate the transactions.

In some embodiments, the interface 260 may generate annotation webpages for an end user to provide annotation for an unannotated transaction. The interface 260 may generate different annotation webpages for different end users. For example, different users may be subjected to different annotation requirements and thus, the annotation webpages can include different input elements for the different annotation requirements. The annotation requirements may be different due to a client specifying different data fields of the same schema required for different transaction accounts. The annotation requirements may be different due to differences in schemas of third-party platforms. The interface 260 may use a communication channel such as SMS, email, or a SaaS platform website to communicate with end users or administrators of clients.

In one embodiment, the interface 260 also includes an API for clients of the computing server 110 to communicate with the computing server 110 through machines. The API allows the clients to retrieve the computing server 110 stored in the data store 120, send query requests, and make settings through a programming language. Various settings, creation of cards, rules on the cards, rules of annotating transactions, and other functionalities of the various engines 210, 220, 230, 240, and 250 may be changed by the clients through sending commands to the API.

Transaction Annotation Process

Figure 3:
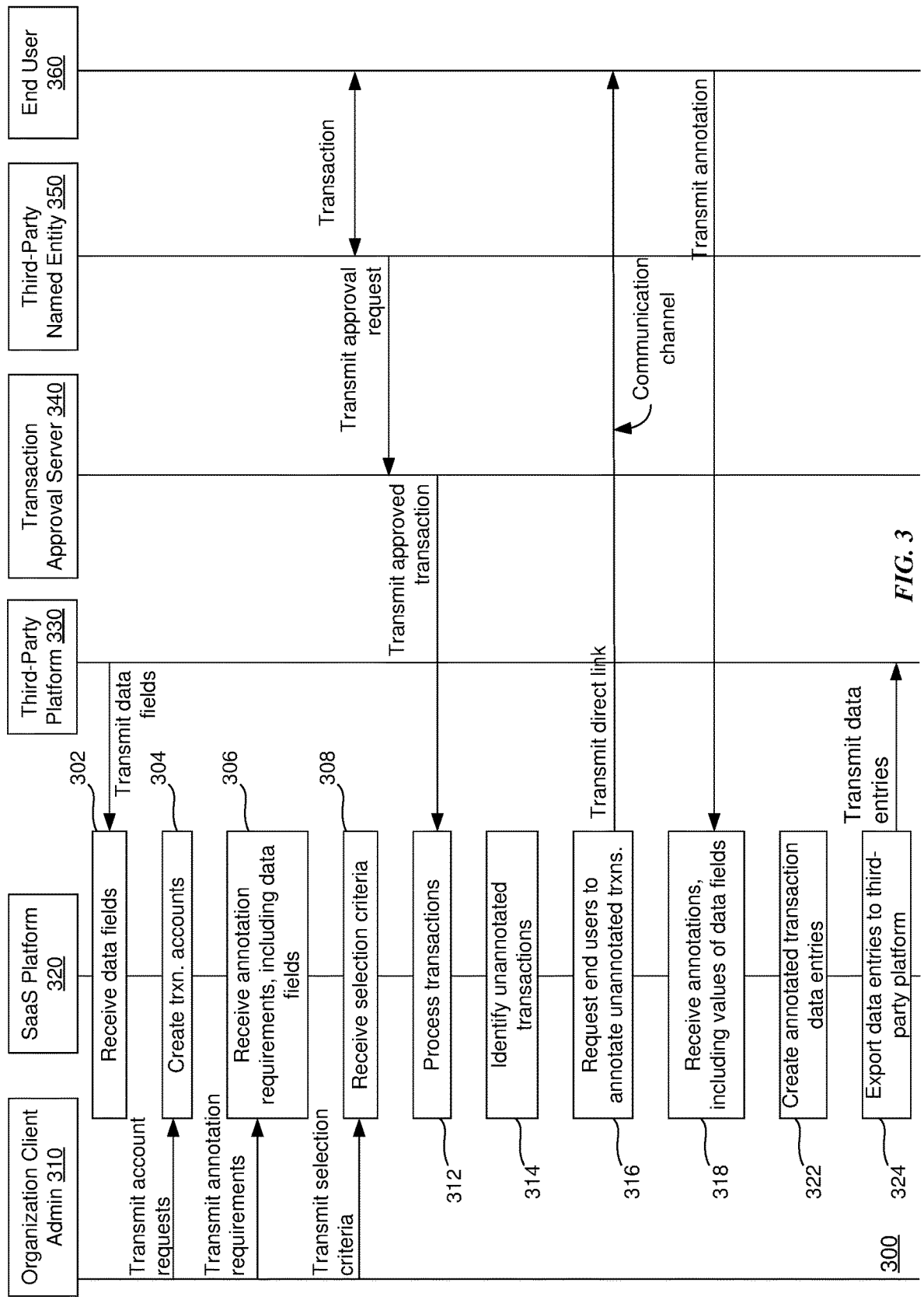
FIG. 3 is an interaction diagram depicting a computer-implemented process for annotating transactions, in accordance with an embodiment.

FIG. 3 is an interaction diagram depicting a computer-implemented process for annotating transactions, in accordance with an embodiment. The process 300 is performed among an organization client administrator 310, a SaaS platform 320, a third-party platform 330, a transaction approval server 340, a third-party named entity 350, and an end user 360. The administrator 310 and the end user 360 may use computing devices to perform the particular interactions shown the process 300 (e.g., incurring a transaction with the third-party named entity 350). For the particular embodiment discussed in FIG. 3, the SaaS platform 320 and the transaction approval server 340 are located separately (e.g., independently operating servers). In some embodiments, both SaaS platform 320 and the transaction approval server 340 may be part of the computing server 110 or controlled by the computing server 110. In the embodiment discussed in FIG. 3, the SaaS platform 320 is controlled by the computing server 110 and shares functionality with the computing server 110. In some embodiments, the computing server 110 may perform some or all of the operations described with respect to FIG. 3 (e.g., the transaction approval performed by the transaction approval server 340).

The SaaS platform 320 receives 302 data fields from the third-party platform 330. The third-party platform 330 may be a bookkeeping platform such as QUICKBOOKS, NETSUITE, or SAGE. Different third-party platforms may have different data fields for annotating transactions. Types of data fields can include Category, Location, Customer Number, Job, or any suitable parameter by which a transaction can be organized. The data fields may be preconfigured by the third-party platform 330, specified by a user of the third-party platform 330, or a combination thereof. The SaaS platform 320 may automatically receive data fields from third-party platforms connected to the SaaS platform 320 through a network (e.g., the network 170). Alternatively, or additionally, the SaaS platform 320 may receive 302 the data fields in response to an administrator (e.g., the administrator 310) specifying the third-party platform 330 to the SaaS platform 320 (e.g., through a user interface for managing transaction annotation requirements). Although the receiving 302 is depicted in the process 300 as occurring before other operations in the process 300, the receiving 302 may be performed in a different sequence (e.g., after creating 304 transaction accounts and before receiving 306 annotation requirements).

The SaaS platform 320 creates 304 transaction accounts in response to requests from the organization client administrator 310. The transaction accounts allow owners of the respective transaction accounts to perform transactions with third-party named entities. The SaaS platform 320 may create 304 transaction accounts in response to receiving requests from the administrator 310 to create transaction accounts. In one example of transaction account creation, the SaaS platform 320 creates credit cards and accounts for an organization client of the administrator 310 and manages transactions of the cards based on rules set by the client. The SaaS platform 320 may generate a portal for the administrator 310 to create transaction accounts. The portal may include user interface input elements that allow the administrator to specify end users of the cards, rules for the cards, annotation requirements for the cards, memo requirements for the cards, receipt requirements for the cards, or any suitable parameter for the creation of a card.

The SaaS platform 320 receives 306 annotation requirements, which include the data fields to be used to annotate transactions. The annotations may specify how transactions are to be annotated, and may include data fields of third-party platform's schema. The schema is used by the third-party platform to organize transaction data. In one example of criteria for how transactions are to be annotated, the administrator 310 specifies to use a schema from the third-party platform 330 and data fields from that schema, which the SaaS platform 320 previously received 302 from the third-party platform 330. An example user interface for specifying annotation requirements is shown in FIG. 6.

The SaaS platform 320 receives 308 selection criteria transmitted by an organization client administrator 310. The selection criteria may specify transactions that need to be annotated. The criteria specifying transactions that need to be annotated may relate to parameters of a transaction (e.g., amount, date, location, goods or service purchased, etc.), parameters of a transaction account (e.g., the end user, an employee title of the end user, a credit limit of the account, etc.), parameters of the third-party named entity (e.g., the name of a merchant, a location of the merchant, a merchant category, etc.), or any suitable parameter describing the transaction. In one example of selection criteria for which transactions are to be annotated, the administrator 310 specifies that transactions made for an amount over one hundred dollars during the months of June through August in the "travel" merchant category are required to be annotated. An example user interface for specifying selection criteria is shown in FIG. 6.

The SaaS platform 320 processes 312 a transaction. A transaction may be a credit card purchase or another event where the transaction approval server 340 is asked to approve in real time a transaction that involves a transaction account managed by the computing server 110. The SaaS platform 320 may process 312 transactions on behalf of the organization client of the administrator 310. The transactions can occur between respective third-party named entities and respective transaction accounts associated with the organization client. The process 300 depicts a transaction incurred between the third-party named entity 350 and the end user 360. For example, the third-party named entity 350 may be an airline ticketing service and the end user 360 may use a computing device (e.g., a laptop) and an end user transaction device (e.g., a credit card) to purchase plane tickets online from a website of the third-party named entity 350. The third-party named entity 350 may transmit an approval request to the transaction approval server 340 to fulfill the transaction (e.g., for fraud prevention). Upon approving the transaction, the transaction approval server 340 may transmit the approval of the transaction to the SaaS platform 320. The SaaS platform 320 may receive transaction data regarding the approved transaction such as the transaction account (e.g., credit card number) involved in the transaction, the named-entity involved in the transaction, the amount, and the date of the transaction. The SaaS platform 320 may process 312 the received, approved transactions by storing the transaction information in a database (e.g., in the account management engine 220). The SaaS platform 320 may maintain a data structure of the transaction information. For example, an entry in the data structure corresponds to a transaction. In a given period, the computing server 110 may manage different organization clients and each client may have a large number of transaction accounts (e.g., corporate credit card accounts). As such, the computing server 110 may process a large number of transactions on behalf of various organization clients.

The SaaS platform 320 identifies 314 unannotated transactions. The SaaS platform 320 may use the selection criteria specified by the organization client administrator 310 to identify the unannotated transaction. The transaction data of the unannotated transactions satisfies the selection criteria. For example, the selection criteria specifies that transactions with amounts over one hundred dollars during the months of June through August in the "travel" merchant category are required to be annotated. Using these criteria and the transaction data processed 312 earlier, the SaaS platform 320 identifies 314 the transaction for an airplane ticket purchased for five hundred dollars in July as an unannotated transaction that needs to be annotated.

The SaaS platform 320 requests 316 end users, including the end user 360, to annotate the unannotated transactions. The SaaS platform 320 may identify a responsible end user of the end users who is associated with a particular unannotated transaction and transmit a direct link to the responsible end user. The direct link may bring the responsible end user directly to an annotation page (e.g., automatically validating a user's login credentials without bringing the user to an intermediate page to provide credentials) specific to the particular unannotated transaction. The annotation page can allow the responsible end user to annotate the particular unannotated transaction in accordance with annotation requirements. The SaaS platform 320 may use a communication channel such as a short message service (SMS) message, email, or a webpage hosted by the SaaS platform 320 to provide the direct link to the responsible end user. In the process 300, the SaaS platform 320 identifies the end user 360 as the responsible end user associated with a particular unannotated transaction. For example, the SaaS platform 320 traverses transaction data processed 312 earlier to determine that the end user 360 is a cardholder of a transaction account incurring the particular unannotated transaction. The SaaS platform 320 may use a user identifier such as an email address, phone number, SaaS platform username, or any suitable electronic address to address the transmitted direct link to the end user 360. For example, the SaaS platform 320 may use a communication channel of email and user identifier of an email address to transmit the direct link to the end user 360. The direct link, which may be a uniform resource locator (URL), brings the end user 360 directly to an annotation page, which may be a webpage on a website hosted by the SaaS platform 320, that is specific to the particular unannotated transaction. The end user 360 may click the URL provided in an email from the SaaS platform 320 that brings the end user 360 to the annotation page requesting the end user 360 provide the data field values specified by the annotation requirements for their transaction account. In some embodiments, the URL brings the end user 360 directly to the annotation page without causing the user to visit any intermediate webpages or provide additional information or selection. The annotation page allows the end user 360 to annotate the particular unannotated transaction in accordance with annotation requirements received 306 from the administrator 310.

In some embodiments, the SaaS platform 320 authenticates the end user 360 using the direct link transmitted to the end user 360. The SaaS platform 320 can create and store, during an earlier session of the end user 360 providing successful login credentials to access the website of the SaaS platform 320, an encrypted token at a device of the end user 360. The encrypted token can be decrypted to determine authentication information such as a date on which the encrypted token was created, an identifier of the device of the end user 360, or a name or alternative user identifier of the end user 360. In some embodiments, the encrypted token is created in response to the end user 360 successfully executing a multifactor authentication (MFA) process. The SaaS platform 320 can receive the encrypted token from the device after the end user 360 selects the direct link. The SaaS platform 320 can decrypt the encrypted token to obtain the authentication information of the end user 360. The SaaS platform 320 may verify, using the direct link and the authentication information, an identity of the end user 360 to allow the end user 360 to annotate the particular unannotated transaction.

The SaaS platform 320 receives 318 annotations, including values for the data fields specified in the received 306 annotation requirements, from the end user 360. The device of the end user 360 transmits data field values for annotation. For example, the end user 360 may provide values such as "Flights" for a data field of type "Category" and "NYC" for a data field of type "Location." The end user 360 may provide these data field values through the annotation page directed to by the direct link. The end user 360 may use the same or a different communication channel to provide the annotations than was used by the SaaS platform 320 to provide the direct link. For example, the direct link may have been provided via email and the end user 360 may use an annotation page hosted by the SaaS platform on a web browser to provide the annotations. The SaaS platform 330 may receive annotations with different data field values depending on the schema and third-party platform to which an end user is subjected to by the organization client that created a transaction account for the end user's use. The SaaS platform 320 may generate different user interfaces for receiving different data field values depending on those schemas and organization client annotation requirements.

The SaaS platform 320 creates 322 annotated transaction data entries that include the values of the data fields that were provided by the end users. The SaaS platform 320 may, for the data structure of transactions generated during processing 312 the approved transaction, annotate the data entries of transactions needed to be annotated under the organization client's annotate requirements. The SaaS platform 320 may generate different data entry fields depending on the schema or third-party platform specified by the organization client administrator 310 (e.g., when receiving 306 the annotation requirements). For example, the organization client of the administrator 310 may specify that data fields of "Category," "Class," and "Customer/Job" are required for annotation, the SaaS platform 320 creates a data entry for transactions of the organization client that include corresponding data fields for annotation and data fields for transaction data (e.g., merchant name and transaction amount). After the end user 360 provides the values for the data fields for annotation, the SaaS platform 320 can create 322 annotated transaction data entries by populating the data fields for "Category," "Class," and "Customer/Job."

The SaaS platform 320 exports 324 the data entries to the third-party platform 330. The data entries may allow the annotated transaction data to be exported 324 in a batch to the third-party platform 330. For example, unstructured transaction data that is not organized into data entries may not be exported via a file format that can be parsed by third-party platforms while structured transaction data that is organized into data entries can be exported via a file format (e.g., a spreadsheet file format) that can be parsed. In some embodiments, the SaaS platform 320 can cause a graphical user interface that allows the organization client administrator 310 to manage transactions to display whether transactions have been annotated and what data field values have been provided by end users to annotate the transactions.

Transaction Annotation Interfaces

Figure 8:
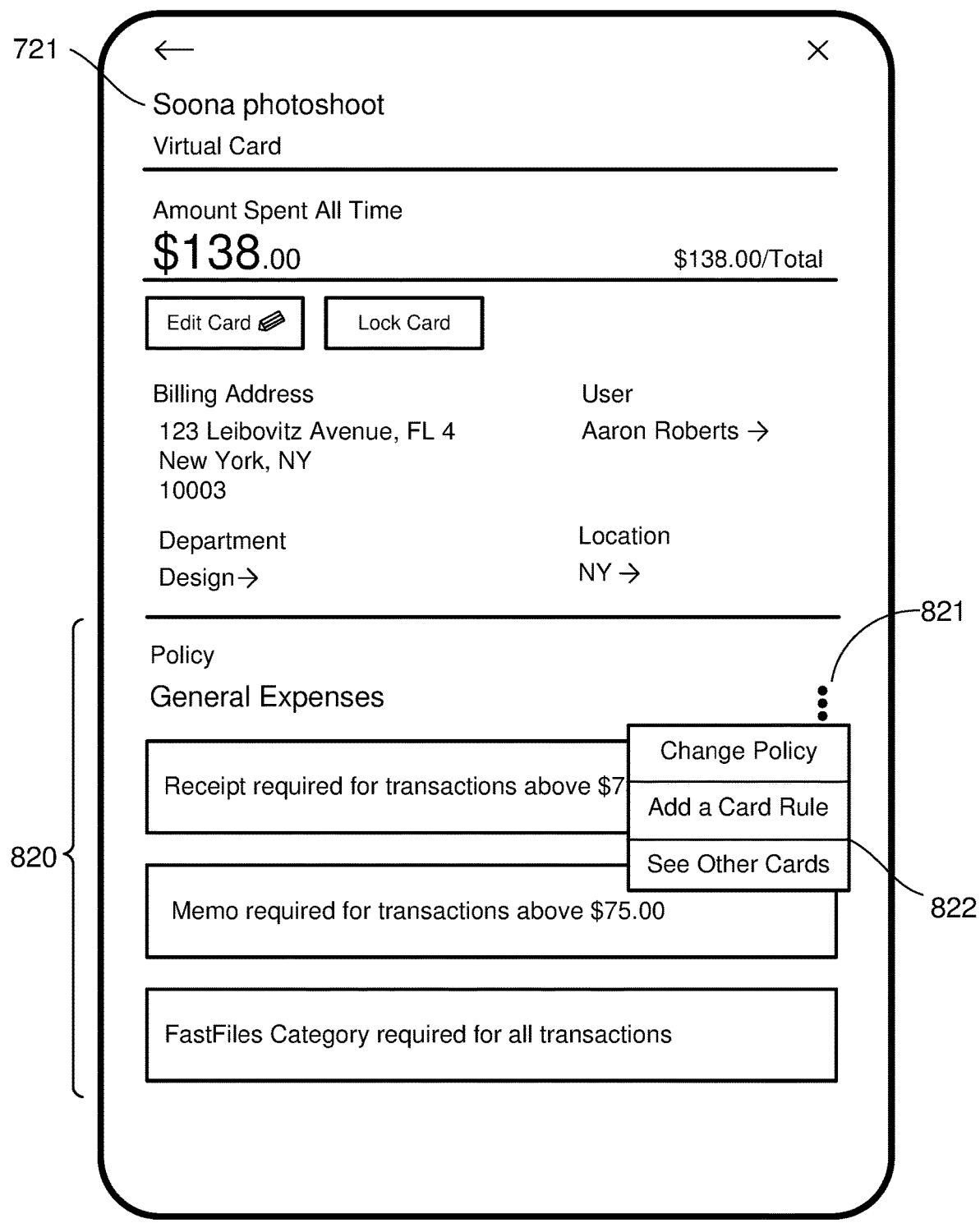
FIG. 8 illustrates an interface for managing rules of a card of the card management portal of FIG. 7, in accordance with an embodiment.

FIG. 4 through FIG. 8 depict various interfaces for interacting with the computing server 110 to annotate transactions. The computing server 110 may identify transactions that need to be annotated and prompt the end user responsible for annotating the transaction (e.g., the end user who incurred the transaction) to provide data fields according to a particular third-party platform's schema. The computing server 110 may prompt an end user via a communication channel such as SMS using natural language prompts as depicted in FIG. 4. The computing server 110 can prompt an end user via a direct link to an annotation webpage via a communication channel such as email and SaaS platform (e.g., a website for annotating the transaction) as depicted in FIG. 5A through FIG. 5H. A client may view transactions and manage the annotation of those transactions using various interfaces generated by the computing server 110. These interfaces may be generated on a client device (e.g., the interface 144 of the client device 150). Examples of interfaces for clients are depicted in FIGS. 6, 7 and 8.

FIG. 4 depicts example transaction annotation interactions 400 using a device of an end user, in accordance with an embodiment. The interactions 400 may occur between the end user and the computing server 110. The end user may use the client device 150 to facilitate the interactions 400. Alternatively, or additionally, the end user may use the end user transaction device 130 (e.g., a smartphone with access to communication channels, such as SMS, and digital payment cards) to facilitate the interactions 400. The end user can use the client device 150 to receive SMS messages from the computing server 110 and sends messages to the computing server 110. The computing server 110 can maintain a profile of the end user at the client profile management engine 210, including contact information such as an email or phone number. The phone number may be the number associated with the client device 150 and may be used to communicate SMS messages with the computing server 110. The interactions 400 show the end user providing information regarding a transaction that occurred (e.g., using a transaction account of the end user). In particular, the computing server 110 may request that end users provide annotations using SMS messages guiding the end users to select certain tags for annotating a transaction. One such example is shown in the interactions 400 of FIG. 4.

The interactions 400 include a message 410 provided from the end user to the computing server 110. The message 410 includes an image of a receipt of a transaction (e.g., occurred using a transaction account of the end user). Upon receiving the image of the receipt, the computing server 410 may provide an acknowledgement message 411 that the image is being processed (e.g., using computer vision to recognize transaction data depicted in the image). After parsing the receipt and matching the receipt to a transaction that was processed (e.g., operation 312 of FIG. 3), the computing server 110 may transmit a confirmation message 412 that the receipt was mapped to a particular transaction.

The interactions 400 include a memo message 413 provided by the end user to the computing server 110 to annotate the transaction that was referenced by the computing server 110 in message 412. The memo may be a string describing the end user's intention by incurring the transaction. The message 413 may be provided unprompted. That is, the computing server 110 does not provide a SMS message to the end user to request the memo and may determine that the message 413 is intended to be a memo for the transaction. The computing server 110 may apply a machine learning model trained to identify memos from a string of text. The computing server 110 may apply the model in response to receiving an unprompted message. For example, the computing server 110 may determine an absence of a prompting message immediately preceding the message 413 and thus, determine that the message 413 is unprompted. The machine learning model may be trained using historical memos received by the computing server 110 that have been tagged with a label indicating the presence of absence of a memo in the historical memos. The computing server may generate feature vectors using the historical memos. Dimensions of the feature vectors may include transaction data or types of transaction data present in the historical memos. For example, if the memo of message 413 was used in training the machine learning model, a feature vector may be generated with a transaction data type of "merchant category" (e.g., category of "education") as a dimension of the feature vector. The machine learning model may determine an association between feature vectors and the absence or presence of a memo in the received message. Accordingly, the computing server 110 may use machine learning to parse memos that are received unprompted. The computing server 110 may associate the memos with corresponding transactions by updating a transaction data entry with the memo (e.g., storing the memo string in the data entry). In response to receiving the memo and updating a data entry with the memo, the computing server 110 may provide a confirmation message 414 to the end user.

The interactions 400 include messages 415 and 416 for annotating the transaction as confirmed by the message 412. The prompting message 415 requests the end user to annotate the transaction with a particular data field of a particular third-party platform's schema. In the example depicted, the third-party platform is named "FastFiles" and has a data field of a "category" type. The message 415 generated by the computing server 110 requests that the end user provide which FastFiles category the transaction falls under and provides examples of existing categories available with FastFiles such as "Education" or "Equipment." In some embodiments, the computing server 110 determines example annotation data values by which the transaction is most likely to be annotated. The computing server 110 may use the information determined through parsing a receipt or identifying a memo to determine likely annotation data values. For example, the computing server 110 may use the memo in message 413 to determine that the merchant category of the transaction is education, and determine that the likelihood that the FastFiles category is Education is the most likely data value for the "category" data field. The computing server 110 may use historical transactions and corresponding annotations to generate or train a model (e.g., statistical model or machine learning model) to determine likely annotation data values. The determined data values may be used to automatically annotate transactions or used to suggest to the end user for confirmation. As shown in FIG. 4, the computing server 110 provides the determined data values "Education" and "Equipment" to the end user, who then responds with the data value in message 416. The end user thus provides an annotation value of "Education" for the computing server 110 to annotate a data entry corresponding to the transaction.

Figure 5B:
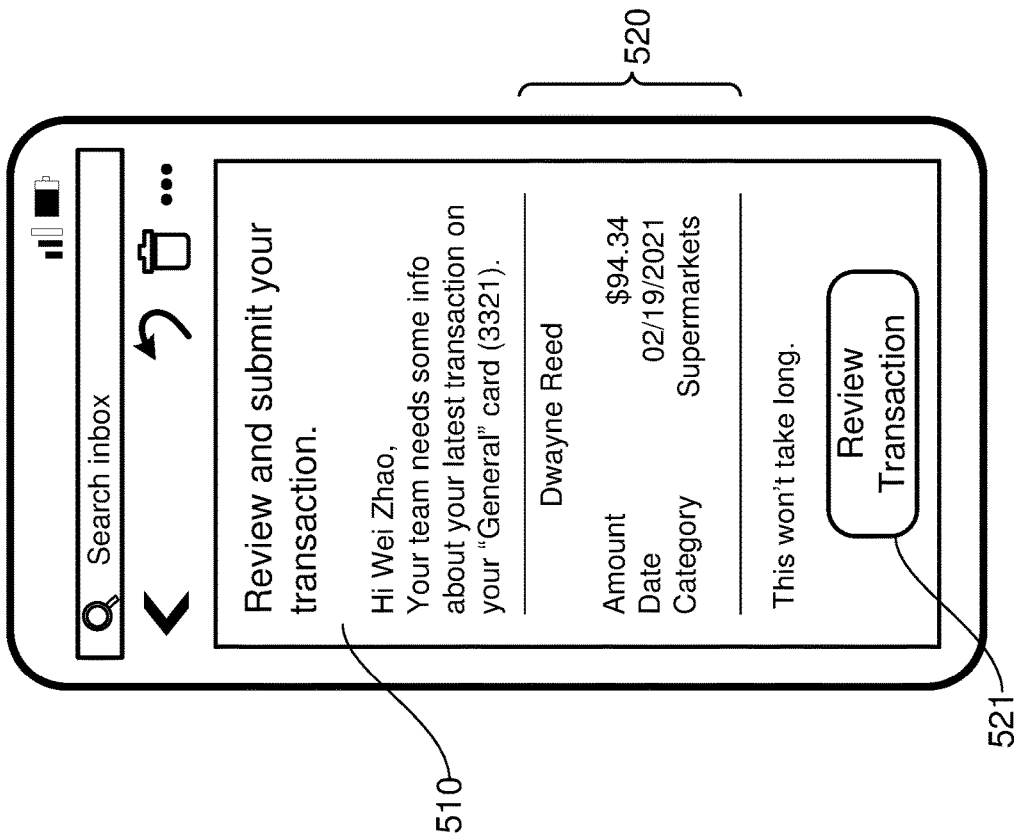
FIGS. 5A-H depict example user interfaces for annotating a transaction using a device of an end user, in accordance with an embodiment.
Figure 5A:
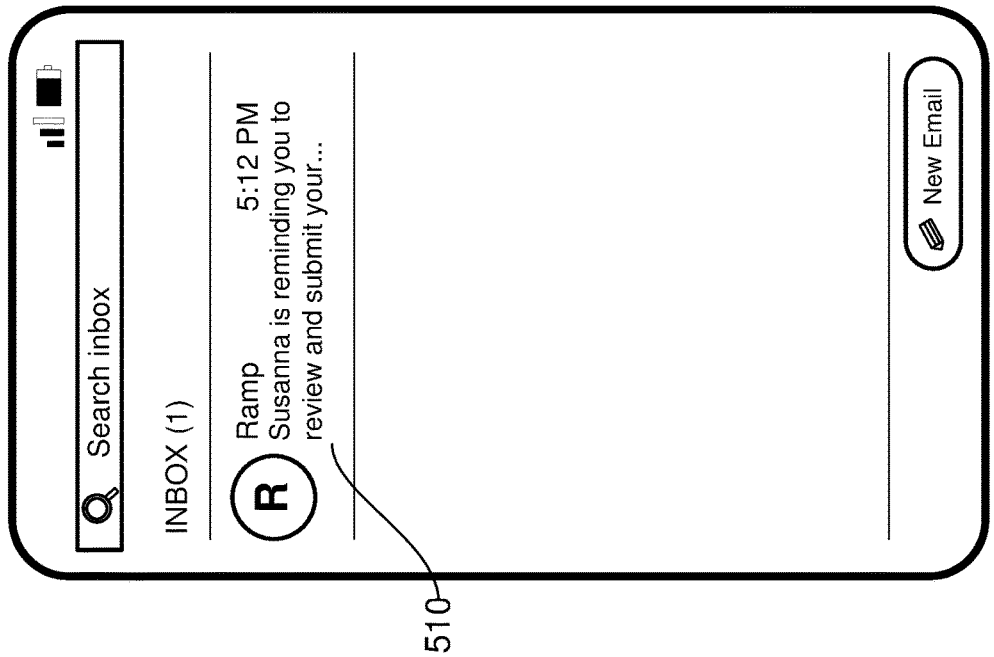
Figure 5D:
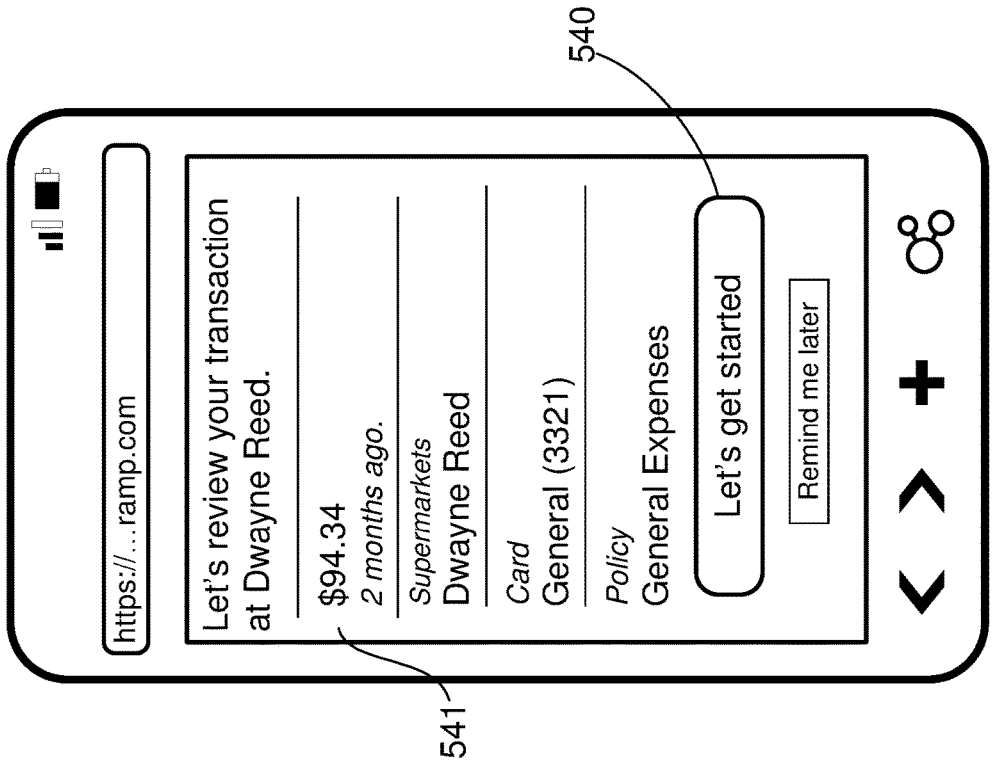

FIGS. 5A-H depicts example user interfaces 500a-h for annotating a transaction using a device of an end user, in accordance with an embodiment. The interface 260 of computing server 110 may generate the emails as shown in FIGS. 5A and 5B and the webpages shown in FIGS. 5C-5H. Local applications on the client device may facilitate the display of the emails and webpages generated by the interface 260. For example, an email application of the client device may generate the interfaces 500a and 500b for displaying the email 510 displayed as a preview in the interface 500a and in additional detail in the interface 500b.

The interfaces 500a-h are displayed on a display of a client device (e.g., the client device 150) of an end user. The interfaces 500a-h show interactions between the computing server 110 and an end user for annotating a transaction according to a third-party platform's schema. FIG. 5A depicts an interface 500a of an email service used to display the email 510. The email 510 may be generated by the computing server 110. The email 510 may notify the end user of an unannotated transaction that needs to be annotated. The email 510 may be transmitted by the computing server 110 after the computing server 110 identifies an unannotated transaction of a transaction account of the end user.

Upon selecting to view the email 510, the user may be directed to the interface 500b of FIG. 5B. The interface 500b is of the email service of FIG. 5A. The interface 500b displays the email 510 in greater detail than as shown in the preview in the interface 500a. The interface 500b includes a button 521 that has a direct link embedded within the button 521. After the end user selects the button 521, the computing server 110 receives the end user's request to be directed to an annotation webpage.

Figure 5C:
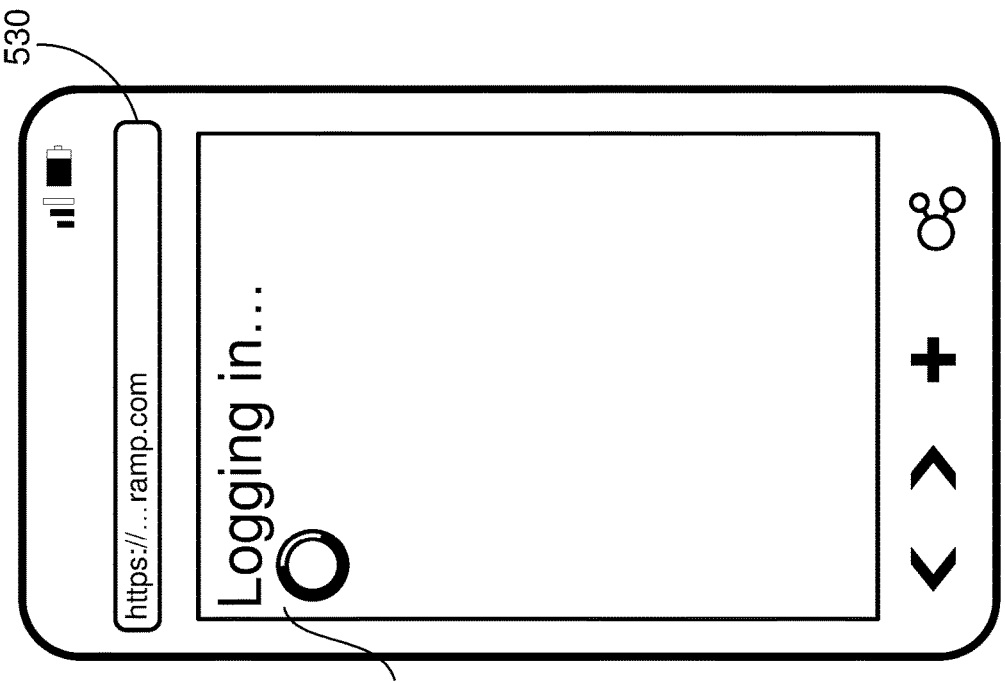
Figure 5F:
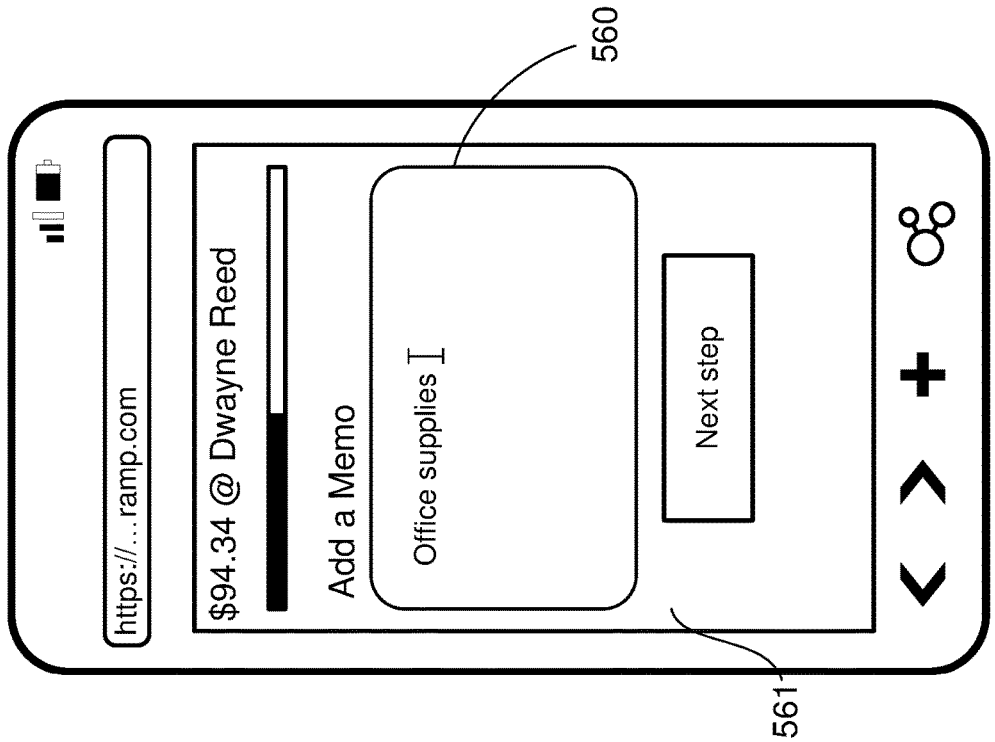

The end user may direct the user to an intermediate webpage 531 shown in the interface 500c of FIG. 5C. The interface 500c may be generated using a web browsing application of the end user's client device. The intermediate webpage 531 contains an acknowledgement message that the computing server 110 is logging the user into their account with the computing server 110. The intermediate webpage 531 may also contain a loading status indicator.

The intermediate webpage 531 may have a web address 530 at a domain of the computing server 110. The web addresses shown in the interfaces 500c-h as the same address for simplicity and clarity within the figures, but the different web pages shown in the interfaces 500c-h may be located at different web addresses.

As the end user is shown the webpage 531, the computing server 110 may authenticate the end user's identity. The end user authentication engine 250 of the computing server 110 may access an encrypted token stored on the web browsing application that the end user is using in FIGS. 5C-H. The computing server 110 can use the direct link embedded within the button 521 in combination with authentication information decrypted from the encrypted token to determine that the end user's identity is verified and can access an annotation webpage without providing additional login credentials. In other words, the direct link embedded within the button 521 can take the end user directly to an annotation webpage without an intermediate page prompting the user to provide login credentials.

Figure 5E:
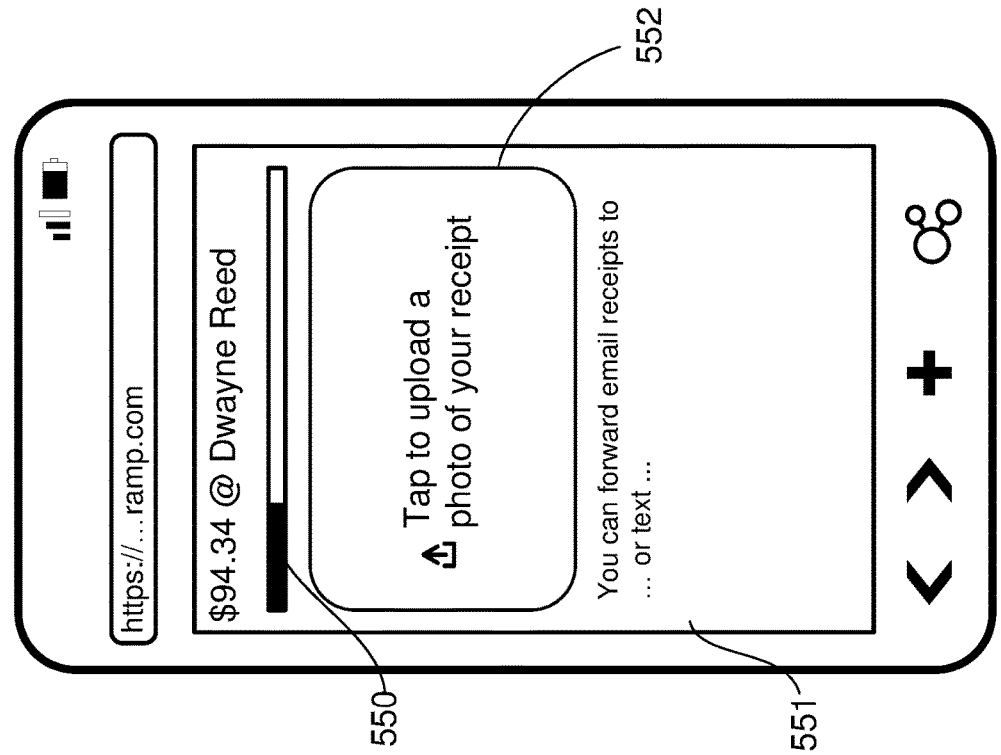

After validating the identity of the end user, the computing server 110 provides the webpage 541 for display at the client device. The webpage 541 includes a button 540 that, upon selection, initiates a process for enabling the user to provide information about the transaction (e.g., a receipt, memo, and annotations). The information provided through interfaces 500e-h may be stored in a data entry for the unannotated transaction. FIG. 5E shows the interface 500e that includes the webpage 551 where a user can select button 551 to upload an image of the receipt of the unannotated transaction. A progress bar 550 may be included in the webpage 551. The progress bar 550 may dynamically change in appearance to reflect the amount of progress that the end user has made in providing information about the unannotated transaction. As shown in FIGS. 5E-H, the progress bar 550 increases to reflect the continued progress of the end user.

Figure 5H:
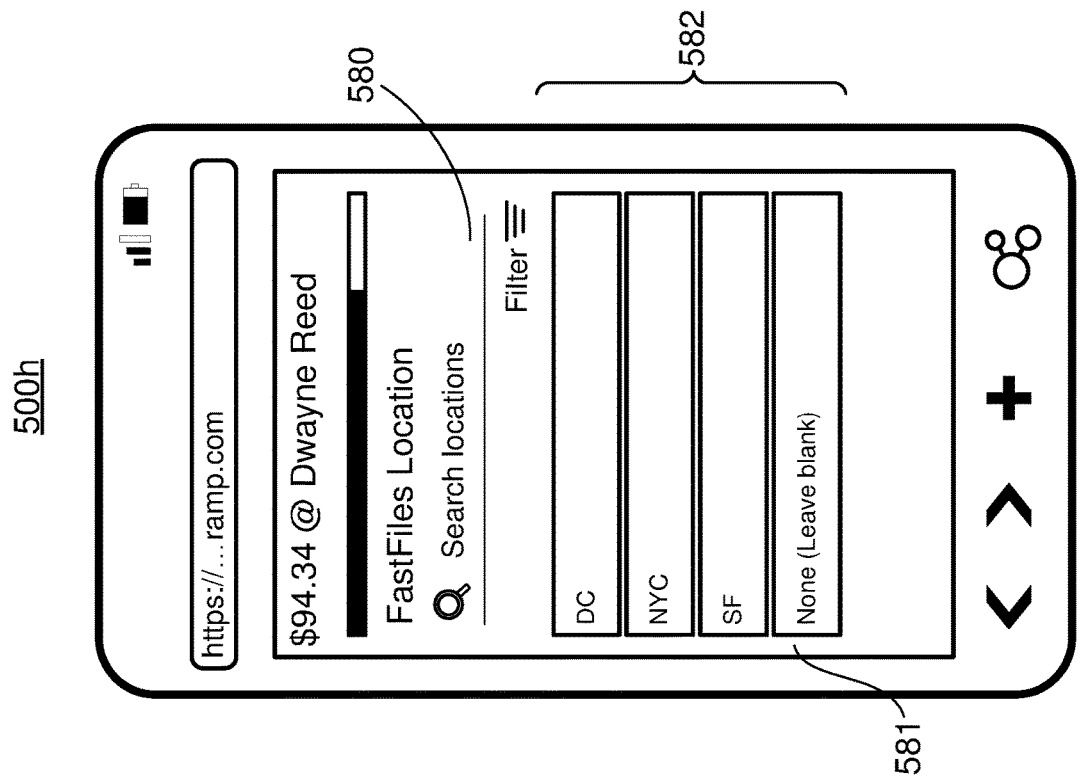
Figure 5G:
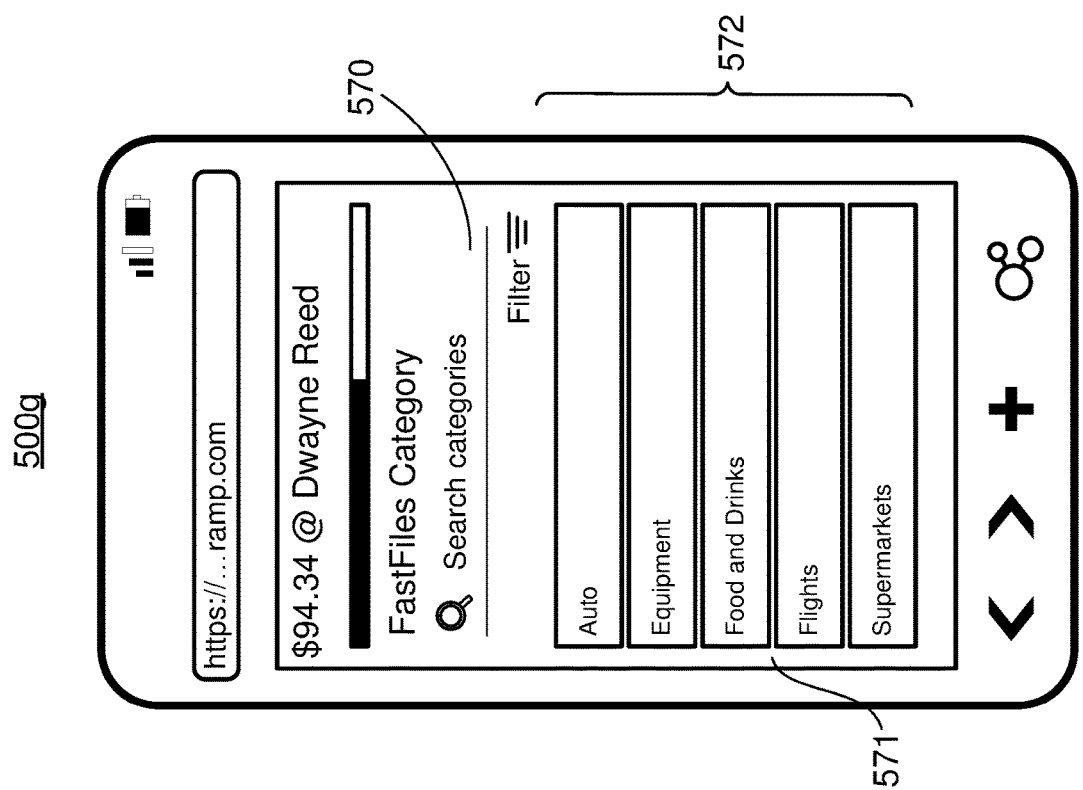

After the end user uploads a receipt of the transaction, the computing server 110 may provide the webpage 561 for display. The interface 500f of FIG. 5F includes the webpage 561 that enables the end user to provide a memo within the input field 560. After the end user provides the memo, the computing server 110 may provide the webpage 571 for display at the client device. Both interfaces 500g and 500h enable the user to annotate the unannotated transaction with a particular data field of a third-party platform's schema. As depicted in FIG. 5G, the third-party platform of FastFiles has a schema with a "Category" data field. The webpage 571 shown in the interface 500g includes a search field 570 for finding a particular data value available for the "Category" data field. Further, the webpage 571 includes a menu 572 of annotation data value options for the "Category" data field. As depicted in FIG. 5H, the schema of FastFiles has a "Location" data field. The webpage 581 shown in the interface 500h includes a search field 580 for finding a particular data value available for the "Location" data field of the schema. Further, the webpage 581 includes a menu 582 of annotation data value options for the "Location" data field. The user may select a data value from the respective menus 572 and 582, thus providing annotations, including values of the "Category" and "Location" data fields, for the unannotated transaction. The computing server 110 may then create an annotated transaction data entry for the unannotated transaction by including the data values for "Category" and "Location" into a data entry for the unannotated transaction.

FIG. 6 illustrates a transaction data collection management portal 600, in accordance with an embodiment. The transaction data collection management portal 600 enables a user (e.g., an organization client administrator) to specify what transaction information is to be collected from transactions and under what conditions the transaction information is to be collected. The portal 600 is a GUI that may be provided by the interface 250 of the computing system 110. The portal 600 includes GUI input fields 610-650. The input field 610 allows the user to specify whether or not a receipt is required and the condition that the receipt for a transaction is or is not required. The input field 620 allows the user to specify whether or not a memo is required and the condition that the memo for a transaction is or is not required. The input fields 630, 640, and 650 allow the user to specify whether or not certain schema data fields are required for annotation and under which conditions a transaction should or should not be annotated with those certain schema data fields. Available data fields for the third-party platform FastFiles is shown in the input fields 630, 640, and 650 of the portal 600. The input field 630 allows the user to specify a "Category" data field of the FastFiles schema as an annotation requirement under a particular selection criterion. A dropdown menu 631 may expand upon a user selection to reveal various annotation requirement options such as "Required" or "Not Required." A dropdown menu 632 may expand upon a user selection to reveal various selection criteria options such as "All Transactions," "Transactions Above," or "Transactions Below." Certain selection criteria options may cause the interface 250 to dynamically add or remove UI elements displayed on the portal 600. For example, if a user selects "Transactions Above" in the dropdown menu 632, the interface 250 may cause an additional input field to appear within the input field 630. For example, the additional input field allows the user to enter an amount for which transactions that exceed the amount must be annotated with a FastFiles Category.

Connecting FIG. 6 to FIGS. 5A-H, the user selections in the input field 610 may cause the computing server 110 to generate the interface 500e for the user to provide a receipt when the transaction is for an amount over seventy five dollars. Similarly, the user selections in the input field 620 may cause the computing server 110 to generate the interface 500f for the user to provide a memo when the transaction is for an amount over seventy five dollars. The user selections in the input field 630 may cause the computing server 110 to generate the interface 500g for providing a FastFiles Category.

FIG. 7 illustrates a card management portal 700, in accordance with an embodiment. The portal 700 is a GUI that may be provided by the interface 250 of the computing system 110. The portal 700 may be used by an organization client administrator to manage transaction accounts (e.g., credit cards) issued to end users. The portal 700 includes a navigation menu 710 and a navigation option 711 for "Cards." Upon selecting the option 711, the portal 700 may display a data structure (e.g., a table) listing information about the cards assigned to end users such as the card name, cardholder, current balance, balance limit, an administrator-organized group of cards following a shared set of rules (e.g., a card program), and a location of the cardholder. The data entries 720, 730, and 740 are examples of entries for transaction accounts mapping to other Figures in the present application. For example, the card in data entry 730 assigned to Jonathan in Pennsylvania may be the card used to incur the transaction described in FIG. 4 for books. In another example, the card in data entry 740 assigned to Wei in New York may be the card used to incur the transaction described in FIGS. 5A-H for office supplies. The data entry 720 showing a card assigned to Aaron with the name 721 of "Soona Photoshoot" is described further in the description of FIG. 8.

FIG. 8 illustrates an interface 800 for managing rules, including annotation requirements, of a card of the card management portal of FIG. 7, in accordance with an embodiment. The interface 800 may be generated by the interface 250 of the computing server 110 for an organization client administrator. The card having the name 721 of "Soona photoshoot" is shown in the interface 800. The interface 800 may be generated in response to the administrator selecting the data entry 720 from the portal 700. The interface 800 includes a summary of the transaction account information such as the active balance, the end user to which the card is assigned, the billing address, the department of the organization client to which the card is assigned, and the location of the end user. The interface 800 also includes a section 820 summarizing a policy, or a set of rules, under which the card operates. The section 820 may include an expansion button 821 that the administrator may select to reveal a menu 822 including buttons for editing the existing rules in the policy, adding a new rule, or viewing rules for other transaction accounts. The policy name of "General Expenses" may be edited using the portal 600 of FIG. 6.

Additional Considerations

The general architecture disclosed herein has applications in various areas, such as a payment transaction annotation process. For example, in a credit card transaction, the credit card company logs data for the transaction incurred between an end user and a merchant, and an end user responsible for the transaction annotates the transaction according to a third-party platform schema's data fields. The computing server may use a direct link to automatically verify the end user's identity to securely annotate the transaction data. In one embodiment, a computing server annotates the transactions by creating an annotated transaction data entry that is filled with the annotation provided by the responsible end user (e.g., category of the transaction, location of the transaction, etc.).

The computing server enables the end users to share annotation information in real time in a standardized format at the computing server regardless of the format in which the information is input by the user. The end users may flexibly use various communication channels to provide annotations, such as email, SMS, or an SaaS platform website. The computing server aggregates the annotation data provided in those various formats into a data structure, which can have a standardized format. For example, one end user may provide annotation through a series of SMS messages while another end user may provide annotation through an annotation webpage hosted by an SaaS platform. Ultimately, the computing server can receive the annotation data and create an annotated transaction data entry according to a standardized format for the client organization to manage transaction data or export to a third-party platform. The computing server that may export the annotated transaction data to a particular third-party platform using the third-party's schema (e.g., by converting the standardized format to third-party's schema).

Additionally, the standardized format can conserve memory resources by reducing redundant data fields. For example, rather than store a merchant category under a first schema's data field of "category" and a second schema's data field of "group," the computing server may determine to consolidate the two data fields into one data field. Thus, the computing server reduces the storage requirements using a standardized data structure for transactions annotated various third-party platform schemas. This standardized format also facilitates data querying, filtering, and sorting agnostic of third-party platform schemas.

The transaction annotation performed by a computing server can also reduce processing resources expended by the computing server by distributing the annotation task to end users. For example, rather than the computing server determining annotation information in varying schemas for tens of thousands of transactions by end users daily, the computing server generates user interfaces that guides the end users to properly annotate transaction information according to an appropriate schema for their client organization or transaction account. In this way, the computing server can reduce processing resources generating a user interfaces at a much smaller scale (e.g., ten of the same interfaces) than processing tens of thousands of different transactions daily.

The computing server may automatically verify end user identity using a direct link that may lead the end user to an annotation webpage. By using a direct link, the computing server enables an end user to conserve processing and network bandwidth resources by not requiring the user to provide login credentials. For example, the user's client device does not need to generate an additional webpage for providing login credentials, saving processing resources, and does not need to transmit the login credentials to the computing server, saving network bandwidth resources.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method for reducing server-side processing resources spent on annotating schema-specific transaction data, the computer-implemented method comprising:
creating a plurality of transaction accounts for an organization client, a transaction account allowing an owner of the transaction account to perform transactions with third-party named entities;
receiving annotation requirements associated with the plurality of transaction accounts of the organization client, wherein the annotation requirements identify a third-party platform and specify a data field of a data schema used by the third-party platform to organize data;
receiving one or more selection criteria from the organization client, the selection criteria specifying transactions that need to be annotated;
processing transactions on behalf of the organization client, wherein processed transactions are represented according to a plurality of different data schema;
identifying, by a server, unannotated transactions from the processed transactions using the one or more selection criteria specified by the organization client;
storing a data instance corresponding to a particular unannotated transaction;
storing, automatically, a first set of metadata in association with the data instance, the first set of metadata retrieved from processing the transactions on behalf of the organization client;
receiving documentation records from end users of the plurality of transaction accounts;
matching, automatically, a documentation record to the particular unannotated transaction corresponding to the data instance, the documentation record including unstructured data;
extracting the unstructured data in the documentation record to generate a second set of metadata using a machine learning model trained to identify transaction-related attributes;
storing the second set of metadata in association with the data instance;
distributing, by the server, annotation workload from the server processing resources to end users by requesting the end users to annotate the unannotated transactions instead of having the server to annotate the unannotated transactions, wherein requesting the end users to annotate the unannotated transactions comprises:
identifying a responsible end user associated with a particular unannotated transaction, the particular unannotated transaction associated with a particular data schema,
generating an annotation user interface that exposes input elements corresponding to data fields required by the particular data schema associated with the particular unannotated transaction,
transmitting a direct link to the responsible end user, the direct link bringing the responsible end user directly to the annotation user interface specific to the particular unannotated transaction, the annotation user interface guiding the responsible end user to supply data field values that comply with the particular data schema, and
wherein distributing the annotation workload reduces the server-side processing resources spent on annotating schema-specific transaction data;
receiving, from the end users, annotations of the unannotated transactions, wherein at least one of the annotations includes data field values of the schema of the third-party platform;
storing a third set of metadata in association with the data instance, the third set of metadata including an annotation provided by the responsible end user; and
displaying, at a graphical user interface for an administrator of the organization client, entries of a plurality of annotated transaction data that include the data field values, the graphical user interface allowing the administrator to export the plurality of annotated transaction data to the third-party platform, wherein the plurality of annotated transaction data comprises the first set of metadata, the second set of metadata generated using the machine learning model, and the third set of metadata, and wherein the graphical user interface is dynamically updated based on real-time interaction data received from the server.

2. The computer-implemented method of claim 1, wherein the graphical user interface is configured to display entries of annotated data according to different schemas of a plurality of third-party platforms, and wherein a first annotation requirement is associated with a first schema of a first third-party platform and a second annotation requirement is associated with a second schema.

3. The computer-implemented method of claim 2, wherein the organization client is a first organization client and the third-party platform is a first third-party platform, further comprising receiving, from an end user of a second organization client, an annotation including data field values of the second schema.

4. The computer-implemented method of claim 2, further comprising:
in response to a first end user selecting a first direct link, generating a first GUI including GUI input elements for receiving a first set of data field values of the first schema; and
in response to a second end user selecting a second direct link, generating a second GUI including GUI input elements for receiving a second set of data field values of the second schema.

5. The computer-implemented method of claim 1, wherein identifying the unannotated transactions from the processed transactions using the one or more selection criteria specified by the organization client comprises:
accessing entries of a transaction data structure including transaction data of the transactions, wherein each entry of the transaction data structure includes transaction data of a corresponding transaction; and
determining a set of the entries satisfy at least one of the one or more selection criteria, the set of entries corresponding to the unannotated transactions.

6. The computer-implemented method of claim 1, wherein the annotations are received through a communication channel comprising a short message service (SMS) message, email, or a software as a service (SaaS) platform.

7. The computer-implemented method of claim 1, wherein the one or more selection criteria includes one or more of a transaction amount, a transaction location, a transaction date, a third-party named entity category, or a third-party named entity name.

8. The computer-implemented method of claim 1, wherein the organization client is a first organization client, the unannotated transactions are a first set of unannotated transactions, and the transactions are a first set of transactions, and further comprising:
identifying, using selection criteria specified by a second organization client, a second set of unannotated transactions of a second set of transactions processed on behalf of the second organization client, wherein the second set of unannotated transactions are to be annotated using the schema of the third-party platform.

9. The computer-implemented method of claim 1, further comprising, in response to the responsible end user selecting the direct link, authenticating the responsible end user, wherein authenticating the responsible end user comprises:
receiving an encrypted token stored on a device of the responsible end user, the encrypted token created in response to the responsible end user successfully executing a multifactor authentication process;
decrypting the encrypted token to obtain authentication information of the responsible end user; and
verifying, using the direct link and the authentication information, an identity of the responsible end user to annotate the particular unannotated transaction.

10. The computer-implemented method of claim 9, wherein the authentication information comprises one or more of a date on which the encrypted token was created, an identifier of the device of the responsible end user, or a name of the responsible end user.

11. A non-transitory computer-readable storage medium configured to store computer code comprising instructions for reducing server-side processing resources spent on annotating schema-specific transaction data, wherein the instructions, when executed by one or more processors, cause the one or more processors to:
create a plurality of transaction accounts for an organization client, a transaction account allowing an owner of the transaction account to perform transactions with third-party named entities;
receive annotation requirements associated with the plurality of transaction accounts of the organization client, wherein the annotation requirements identify a third-party platform and specify a data field of a data schema used by the third-party platform to organize data;
receive one or more selection criteria from the organization client, the selection criteria specifying transactions that need to be annotated;
process transactions on behalf of the organization client, wherein processed transactions are represented according to a plurality of different data schema;
identify, by a server, unannotated transactions from the processed transactions using the one or more selection criteria specified by the organization client;
store a data instance corresponding to a particular unannotated transaction;
store, automatically, a first set of metadata in association with the data instance, the first set of metadata retrieved from processing the transactions on behalf of the organization client;
receive documentation records from end users of the plurality of transaction accounts;
match, automatically, a documentation record to the particular unannotated transaction corresponding to the data instance, the documentation record including unstructured data;
extract the unstructured data in the documentation record to generate a second set of metadata using a machine learning model trained to identify transaction-related attributes;
store the second set of metadata in association with the data instance;
distribute, by the server, annotation workload from the server processing resources to end users by requesting the end users to annotate the unannotated transactions instead of having the server to annotate the unannotated transactions, wherein the instruction to request the end users to annotate the unannotated transactions comprises instructions when executed by one or more processors, cause the one or more processors to:
identify a responsible end user associated with a particular unannotated transaction, the particular unannotated transaction associated with a particular data schema,
generate an annotation user interface that exposes input elements corresponding to data fields required by the particular data schema associated with the particular unannotated transaction,
transmit a direct link to the responsible end user, the direct link bringing the responsible end user directly to the annotation user interface specific to the particular unannotated transaction, the annotation user interface guiding the responsible end user to supply data field values that comply with the particular data schema, and wherein distributing the annotation workload reduces the server-side processing resources spent on annotating schema-specific transaction data;

receive, from the end users, annotations of the unannotated transactions, wherein at least one of the annotations includes data field values of the schema of the third-party platform;

store a third set of metadata in association with the data instance, the third set of metadata including an annotation provided by the responsible end user; and display, at a graphical user interface for an administrator of the organization client, entries of a plurality of annotated transaction data that include the data field values, the graphical user interface allowing the administrator to export the plurality of annotated transaction data to the third-party platform, wherein the plurality of annotated transaction data comprises the first set of metadata, the second set of metadata generated using the machine learning model, and the third set of metadata, and wherein the graphical user interface is dynamically updated based on real-time interaction data received from the server.

12. The non-transitory computer-readable storage medium of claim 11, wherein the graphical user interface is configured to display entries of annotated data according to different schemas of a plurality of third-party platforms, and wherein a first annotation requirement is associated with a first schema of a first third-party platform and a second annotation requirement is associated with a second schema.

13. The non-transitory computer-readable storage medium of claim 12, wherein the organization client is a first organization client and the third-party platform is a first third-party platform, further comprising instructions that, when executed by one or more processors, cause the one or more processors to receive, from an end user of a second organization client, an annotation including data field values of the second schema.

14. The non-transitory computer-readable storage medium of claim 12, further comprising instructions that, when executed by one or more processors, cause the one or more processors to:
in response to a first end user selecting a first direct link, generate a first GUI including GUI input elements for receiving a first set of data field values of the first schema; and
in response to a second end user selecting a second direct link, generate a second GUI including GUI input elements for receiving a second set of data field values of the second schema.

15. The non-transitory computer-readable storage medium of claim 11, wherein the instruction for identifying the unannotated transactions from the processed transactions using the one or more selection criteria specified by the organization client comprises instructions that, when executed by one or more processors, cause the one or more processors to:
access entries of a transaction data structure including transaction data of the transactions, wherein each entry of the transaction data structure includes transaction data of a corresponding transaction; and
determine a set of the entries satisfy at least one of the one or more selection criteria, the set of entries corresponding to the unannotated transactions.

16. The non-transitory computer-readable storage medium of claim 11, wherein the annotations are received through a communication channel comprising a short message service (SMS) message, email, or a software as a service (SaaS) platform.

17. The non-transitory computer-readable storage medium of claim 11, wherein the one or more selection criteria includes one or more of a transaction amount, a transaction location, a transaction date, a third-party named entity category, or a third-party named entity name.

18. The non-transitory computer-readable storage medium of claim 11, wherein the organization client is a first organization client, the unannotated transactions are a first set of unannotated transactions, and the transactions are a first set of transactions, and further comprising instructions that, when executed by one or more processors, cause the one or more processors to:
identify, using selection criteria specified by a second organization client, a second set of unannotated transactions of a second set of transactions processed on behalf of the second organization client, wherein the second set of unannotated transactions are to be annotated using the schema of the third-party platform.

19. The non-transitory computer-readable storage medium of claim 11, further comprising instructions that, when executed by one or more processors, cause the one or more processors to, in response to the responsible end user selecting the direct link, authenticate the responsible end user, wherein the instruction for authenticating the responsible end user comprises instructions that, when executed by one or more processors, cause the one or more processors to:
receive an encrypted token stored on a device of the responsible end user, the encrypted token created in response to the responsible end user successfully executing a multifactor authentication process;
decrypt the encrypted token to obtain authentication information of the responsible end user; and
verify, using the direct link and the authentication information, an identity of the responsible end user to annotate the particular unannotated transaction.

20. A system, comprising:
one or more processors; and
memory configured to store instructions for reducing server-side processing resources spent on annotating schema-specific transaction data, wherein the instructions, when executed by the one or more processors, cause the one or more processors to:
create a plurality of transaction accounts for an organization client, a transaction account allowing an owner of the transaction account to perform transactions with third-party named entities;
receive annotation requirements associated with the plurality of transaction accounts of the organization client, wherein the annotation requirements identify a third-party platform and specify a data field of a data schema used by the third-party platform to organize data;
receive one or more selection criteria from the organization client, the selection criteria specifying transactions that need to be annotated;
process transactions on behalf of the organization client, wherein processed transactions are represented according to a plurality of different data schema;
identify, by a server, unannotated transactions from the processed transactions using the one or more selection criteria specified by the organization client;

store a data instance corresponding to a particular unannotated transaction;

store, automatically, a first set of metadata in association with the data instance, the first set of metadata retrieved from processing the transactions on behalf of the organization client;

receive documentation records from end users of the plurality of transaction accounts;

match, automatically, a documentation record to the particular unannotated transaction corresponding to the data instance, the documentation record including unstructured data;

extract the unstructured data in the documentation record to generate a second set of metadata using a machine learning model trained to identify transaction-related attributes;

store the second set of metadata in association with the data instance;

distribute, by the server, annotation workload from the server processing resources to end users by requesting the end users to annotate the unannotated transactions instead of having the server to annotate the unannotated transactions, wherein the instruction to request the end users to annotate the unannotated transactions comprises instructions when executed by one or more processors, cause the one or more processors to:
  identify a responsible end user associated with a particular unannotated transaction, the particular unannotated transaction associated with a particular data schema,
  generate an annotation user interface that exposes input elements corresponding to data fields required by the particular data schema associated with the particular unannotated transaction,
  transmit a direct link to the responsible end user, the direct link bringing the responsible end user directly to the annotation user interface specific to the particular unannotated transaction, the annotation user interface guiding the responsible end user to supply data field values that comply with the particular data schema, and
  wherein distributing the annotation workload reduces the server-side processing resources spent on annotating schema-specific transaction data;

receive, from the end users, annotations of the unannotated transactions, wherein at least one of the annotations includes data field values of the schema of the third-party platform;

store a third set of metadata in association with the data instance, the third set of metadata including an annotation provided by the responsible end user; and display, at a graphical user interface for an administrator of the organization client, entries of a plurality of annotated transaction data that include the data field values, the graphical user interface allowing the administrator to export the plurality of annotated transaction data to the third-party platform, wherein the plurality of annotated transaction data comprises the first set of metadata, the second set of metadata generated using the machine learning model, and the third set of metadata, and wherein the graphical user interface is dynamically updated based on real-time interaction data received from the server.

* * * * *